US012322875B2

(12) United States Patent
Lan et al.

(10) Patent No.: US 12,322,875 B2
(45) Date of Patent: Jun. 3, 2025

(54) ANTENNA STRUCTURE AND ELECTRONIC DEVICE

(71) Applicant: Huawei Technologies Co., Ltd., Shenzhen (CN)

(72) Inventors: Yao Lan, Dongguan (CN); Hanyang Wang, Reading (GB); Zhongying Long, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 128 days.

(21) Appl. No.: 18/043,213

(22) PCT Filed: Jul. 21, 2021

(86) PCT No.: PCT/CN2021/107650
§ 371 (c)(1),
(2) Date: Feb. 27, 2023

(87) PCT Pub. No.: WO2022/042147
PCT Pub. Date: Mar. 3, 2022

(65) Prior Publication Data

US 2023/0318180 A1 Oct. 5, 2023

(30) Foreign Application Priority Data

Aug. 28, 2020 (CN) ......................... 202010882369.5

(51) Int. Cl.
*H01Q 5/385* (2015.01)
*H01Q 1/27* (2006.01)
*H01Q 5/15* (2015.01)

(52) U.S. Cl.
CPC ............. *H01Q 5/385* (2015.01); *H01Q 1/273* (2013.01); *H01Q 5/15* (2015.01)

(58) Field of Classification Search
CPC ............ H01Q 5/20; H01Q 5/30; H01Q 1/243; H01Q 9/16
See application file for complete search history.

(56) References Cited

U.S. PATENT DOCUMENTS

| | | | | |
|---|---|---|---|---|
| 8,942,761 | B2 | 1/2015 | Vance | |
| 10,200,092 | B1 * | 2/2019 | Irci | H04B 7/0413 |
| 2012/0019421 | A1 | 1/2012 | Lai et al. | |
| 2013/0203364 | A1 * | 8/2013 | Darnell | H01Q 1/243 455/90.3 |

(Continued)

FOREIGN PATENT DOCUMENTS

EP 4145631 A1 3/2023

OTHER PUBLICATIONS

Xiaoli Wu, "Dual Frequency MIMO Antenna with Neutralization Line" Jul. 18-21, 2019, 2 pages.

(Continued)

*Primary Examiner* — Jason M Crawford
(74) *Attorney, Agent, or Firm* — Conley Rose, P.C.

(57) ABSTRACT

An antenna structure includes a first radiator, a first feed unit, and a second feed unit. The first radiator includes a first feed point and a second feed point. The first feed unit feeds the antenna structure at the first feed point, and the second feed unit feeds the antenna structure at the second feed point. The first feed point is disposed in a central region. The second feed point is disposed between the central region and an end of the first radiator.

17 Claims, 16 Drawing Sheets

(56) References Cited

U.S. PATENT DOCUMENTS

| | | | | |
|---|---|---|---|---|
| 2017/0033461 | A1 | 2/2017 | Mohajer Jasebi et al. | |
| 2018/0034135 | A1* | 2/2018 | Kwak | H01Q 1/48 |
| 2018/0083344 | A1* | 3/2018 | Han | H01Q 13/106 |
| 2019/0393586 | A1* | 12/2019 | Ayala Vazquez | H01Q 5/328 |
| 2021/0273340 | A1* | 9/2021 | Sun | H01Q 5/10 |
| 2021/0305703 | A1* | 9/2021 | Li | H01Q 9/0442 |
| 2021/0305962 | A1* | 9/2021 | Li | H01Q 1/2291 |
| 2021/0391656 | A1* | 12/2021 | Chen | H01Q 21/28 |
| 2023/0208015 | A1 | 6/2023 | Hsu et al. | |
| 2023/0275345 | A1* | 8/2023 | Liang | H01Q 5/328<br>343/700 R |
| 2023/0318180 | A1* | 10/2023 | Lan | H01Q 9/16<br>343/702 |

OTHER PUBLICATIONS

Qiong Wang "Diversity Performance of an Optimized Meander PIFA Array for MIMO Handsets," Apr. 12-16, 2010, 5 pages.

* cited by examiner (a)

(b)

(a)

(b)

Current distribution in a first resonance

Current distribution in a third resonance

Current distribution in a second resonance

Current distribution in a fourth resonance

Fundamental mode

Current distribution in a first resonance

Current distribution in a third resonance

Current distribution in a second resonance

Current distribution in a fourth resonance

ANTENNA STRUCTURE AND ELECTRONIC DEVICE

CROSS-REFERENCE TO RELATED APPLICATIONS

This is a U.S. National Stage of International Patent Application No. PCT/CN2021/107650 filed on Jul. 21, 2021, which claims priority to Chinese Patent Application No. 202010882369.5 filed on Aug. 28, 2020, both of which are hereby incorporated by reference in their entireties.

TECHNICAL FIELD

This application relates to the field of wireless communication, and in particular, to an antenna structure and an electronic device.

BACKGROUND

In the past, since a conventional second generation (second generation, 2G) mobile communication system mainly supported a call function, an electronic device was only a tool used by people to send and receive short messages and perform voice communication, and a wireless network access function was extremely slow because data was transmitted through a voice channel. Today, with rapid development of wireless communication technologies, in addition to making calls, sending short messages, and taking photos, the electronic device can be used to listen to music online, watch online movies, perform real-time video calling, and the like, which cover various applications such as calls, movies, entertainment, and E-commerce in people's life. For a plurality of functional applications, data needs to be uploaded and downloaded over a wireless network. Therefore, high-speed data transmission becomes extremely important.

As people have an increasing demand for high-speed data transmission, a requirement for an antenna becomes higher. Compared with a single antenna, a multiple-input multiple-output (multi-input multi-output, MIMO) system has advantages such as a larger channel capacity and larger coverage area. However, in the MIMO system, mutual coupling is generated because of excessively small antenna spacing, and consequently radiation performance of an antenna is reduced. In addition, because space reserved for an antenna in an electronic device is limited, how to implement a MIMO system in compact space becomes an urgent problem to be resolved.

SUMMARY

Embodiments of this application provide an antenna structure and an electronic device. The electronic device may include an antenna structure. The antenna structure provided in this embodiment of this application is a dual-antenna structure. Space occupied by the dual-antenna structure is reduced by sharing a same radiator, and isolation between dual antennas is good.

According to a first aspect, an antenna structure is provided, including a first radiator, a first feed unit, and a second feed unit. The first radiator includes a first feed point and a second feed point, the first feed unit feeds the antenna structure at the first feed point, and the second feed unit feeds the antenna structure at the second feed point. The first feed point is disposed in a central region, distances between all points in the central region and a center of the first radiator are less than one sixteenth of a first wavelength, and the first wavelength is a wavelength corresponding to a first resonance generated by the antenna structure when the first feed unit is feeding. The second feed point is disposed between the central region and an end of the first radiator.

According to the technical solution in this embodiment of this application, space occupied by a dual-antenna structure is reduced by sharing a same radiator, and isolation between dual antennas is good.

With reference to the first aspect, in softie possible implementations of the first aspect, a distance between the second feed point and the end of the first radiator is between three sixteenths and five sixteenths of a second wavelength. The second wavelength is a wavelength corresponding to a second resonance generated by the antenna structure when the first feed unit is feeding, and a frequency of a resonance point of the second resonance is greater than a frequency of a resonance point of the first resonance.

According to the technical solution in this embodiment of this application, the feed points of the antenna structure are arranged in an asymmetrical manner, so that design in the electronic device is more flexible. It should be understood that, because the distance between the second feed point and the end of the first radiator is between three sixteenths to five sixteenths of the second wavelength, the antenna structure may work in a high frequency band.

With reference to the first aspect, in some implementations of the first aspect, when the second feed unit is feeding, the antenna structure generates a third resonance and a fourth resonance, and a frequency of a resonance point of the fourth resonance is greater than a frequency of a resonance point of the third resonance.

With reference to the first aspect, in some implementations of the first aspect, the first resonance and the third resonance are within a first operating frequency band of the antenna structure. The second resonance and the fourth resonance are within a second operating frequency band of the antenna structure.

According to the technical solution in this embodiment of this application, the antenna structure may be used as dual antennas, and may be applicable to a MIMO system.

With reference to the first aspect, in some implementations of the first aspect, an operating frequency band of the antenna structure that corresponds to the first resonance covers 2402 MHz to 2480 MHz, and an operating frequency band of the antenna structure that corresponds to the second resonance covers a 5G frequency band of wireless fidelity Wi-Fi.

According to the technical solution in this embodiment of this application, the antenna structure may work in a 2.4 GHz frequency band and a 5G frequency band that correspond to Wi-Fi, and be used as dual antennas of a Wi-Fi frequency band.

With reference to the first aspect, in some implementations of the first aspect, a length of the first radiator is half of the first wavelength.

According to the technical solution in this embodiment of this application, the length of the first radiator may be half of the first wavelength, and may be adjusted based on an actual design and production requirement.

With reference to the first aspect, in some implementations of the first aspect, when the first feed unit is feeding at the first feed point, the antenna structure generates a first pattern. When the second feed unit is feeding at the second feed point, the antenna structure generates a second pattern. The first pattern and the second pattern are complementary.

According to the technical solution in this embodiment of this application, the antenna structure is omnidirectional, and may be used in an antenna switching solution. For example, the antenna structure works in a Wi-Fi frequency hand, and one of dual antennas may be selected as a communication antenna based on strength of a Wi-Fi signal.

With reference to the first aspect, in some possible implementations of the first aspect, a distance between the first feed point and the second feed point is between three eighths and five eighths of the second wavelength. The second wavelength is the wavelength corresponding to the second resonance generated by the antenna structure when the first feed unit is feeding. The frequency of the resonance point of the second resonance is greater than the frequency of the resonance point of the first resonance.

According to a second aspect, an electronic device is provided, including at least one antenna structure according to the first aspect.

With reference to the second aspect, in some implementations of the second aspect, the electronic device is a earphone.

According to the technical solution in this embodiment of this application, the antenna structure has a small size, and may be applied to an electronic device of an extremely small size, such as a earphone. A first radiator may be disposed along a housing of the earphone. To prevent a human ear from absorbing a signal of an electromagnetic wave, which affects a radiation characteristic of the antenna structure, the antenna structure may be disposed along a side that is of the housing and that is away from the human ear.

With reference to the second aspect, in some implementations of the second aspect, the electronic device may further include an antenna support. A first radiator in the antenna structure is disposed on a surface of the antenna support.

With reference to the second aspect, in some implementations of the second aspect, the electronic device may further include a rear cover. The first radiator in the antenna structure is disposed on a surface of the rear cover.

According to the technical solution in this embodiment of this application, the first radiator may be disposed on a bezel or the rear cover of the electronic device, and may be implemented by a laser-direct-structuring, flexible circuit board printing, floating metal, or the like. A location at which the antenna structure provided in this application is disposed is not limited in this embodiment of this application.

According to a third aspect, an antenna structure is provided. The antenna structure includes a first radiator, a first feed unit, a second teed unit, a second radiator, and a third radiator. The first radiator includes a first feed point and a second feed point, the first feed unit feeds the antenna structure at the first feed point, and the second feed unit feeds the antenna structure at the second feed point. When the first feed unit is feeding, the antenna structure generates a first resonance and a second resonance. When the second feed unit is feeding, the antenna structure generates a third resonance and a fourth resonance. The first resonance and the third resonance are within a first operating frequency band of the antenna structure, the second resonance and the fourth resonance are within a second operating frequency band of the antenna structure, and frequencies of all frequency points in the second operating frequency band are higher than frequencies of all frequency points in the first operating frequency band. A distance between the first feed point and the second feed point is between three eighths and five eighths of a second wavelength, and the second wavelength is a wavelength corresponding to the second resonance. The second radiator is disposed on a side that is of the first radiator and that is away from the second feed point, and a gap is formed between the second radiator and the first radiator. The second radiator is grounded at an end that is away from the first radiator. The third radiator is disposed on a side that is of the first radiator and that is close to the second teed point, and a gap is formed between the third radiator and the first radiator. The third radiator is grounded at an end that is away from the first radiator.

With reference to the third aspect, in some implementations of the third aspect, the first operating frequency band covers 2402 MHz to 2480 MHz, and the second operating frequency band covers a 5G frequency band of wireless fidelity Wi-Fi.

With reference to the third aspect, in some implementations of the third aspect, when the first feed unit is feeding at the first feed point, the antenna structure generates a first pattern. When the second feed unit is feeding at the second feed point, the antenna structure generates a second pattern. The first pattern and the second pattern are complementary.

According to a fourth aspect, an electronic device is provided, including at least one antenna structure according to the third aspect.

With reference to the fourth aspect, in some implementations of the fourth aspect, the electronic device further includes an antenna support. A first radiator, a second radiator, and a third radiator in the antenna structure are disposed on a surface of the antenna support.

With reference to the fourth aspect, in some implementations of the fourth aspect, the electronic device further includes a rear cover. A first radiator, a second radiator, and a third radiator in the antenna structure are disposed on a surface of the rear cover.

With reference to the fourth aspect, in some implementations of the fourth aspect, the electronic device further includes a metal bezel, and the metal bezel includes a first radiator, a second radiator, and a third radiator in the antenna structure.

With reference to the fourth aspect, in some implementations of the fourth aspect, the electronic device is a mobile phone.

According to a fifth aspect, an antenna structure is provided. The antenna structure includes: a first radiator, a first feed unit, a second feed unit, a second radiator, a first capacitor, and a second capacitor. The first radiator includes a first feed point and a second feed point, the first feed unit feeds the antenna structure at the first feed point, and the second feed unit feeds the antenna structure at the second feed point. When the first feed unit is feeding, the antenna structure generates a first resonance and a second resonance. When the second feed unit is feeding, the antenna structure generates a third resonance and a fourth resonance, the first resonance and the third resonance are within a first operating frequency band of the antenna structure, the second resonance and the fourth resonance are within a second operating frequency band of the antenna structure, and frequencies of all frequency points in the second operating frequency band are higher than frequencies of all frequency points in the first operating frequency band. A distance between the first feed point and the second feed point is between three eighths and five eighths of a second wavelength, and the second wavelength is a wavelength corresponding to the second resonance. The first capacitor is grounded at one end of the first radiator. The second capacitor is grounded at the other end of the first radiator.

With reference to the fifth aspect, in some implementations of the fifth aspect, the first operating frequency band covers 2402 MHz, to 2480 MHz, and the second operating frequency band covers a 5G frequency hand of wireless fidelity Wi-Fi.

With reference to the fifth aspect; in some implementations of the fifth aspect, when the first feed unit is feeding at the first feed point, the antenna structure generates a first pattern. When the second feed unit is feeding at the second feed point, the antenna structure generates a second pattern. The first pattern and the second pattern are complementary.

According to a sixth aspect, an electronic device is provided, including at least one antenna structure according to the fifth aspect.

DESCRIPTION OF EMBODIMENTS

The following describes technical solutions of this application with reference to accompanying drawings.

The technical solutions provided in this application are applicable to an electronic device that uses one or more of the following communication technologies: a Bluetooth (Bluetooth, BT) communication technology, a global positioning system (global positioning system, GPS) communication technology, a wireless fidelity (wireless fidelity, Wi-Fi) communication technology, a global system for mobile communications (global system for mobile communications, GSM) communication technology, a wideband code division multiple access (wideband code division multiple access, WCDMA) communication technology, a long term evolution (long term evolution, LTE) communication technology, a 5G communication technology, and other future communication technologies. An electronic device in embodiments of this application may be a mobile phone, a tablet computer, a notebook computer, a smart band, a smartwatch, a smart helmet, smart glasses, or the like. Alternatively, the electronic device may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, an in-vehicle device, an electronic device in a 5G network, an electronic device in a future evolved public land mobile network (public land mobile network, PLMN), or the like. This is not limited in this embodiment of this application.

Figure 1:
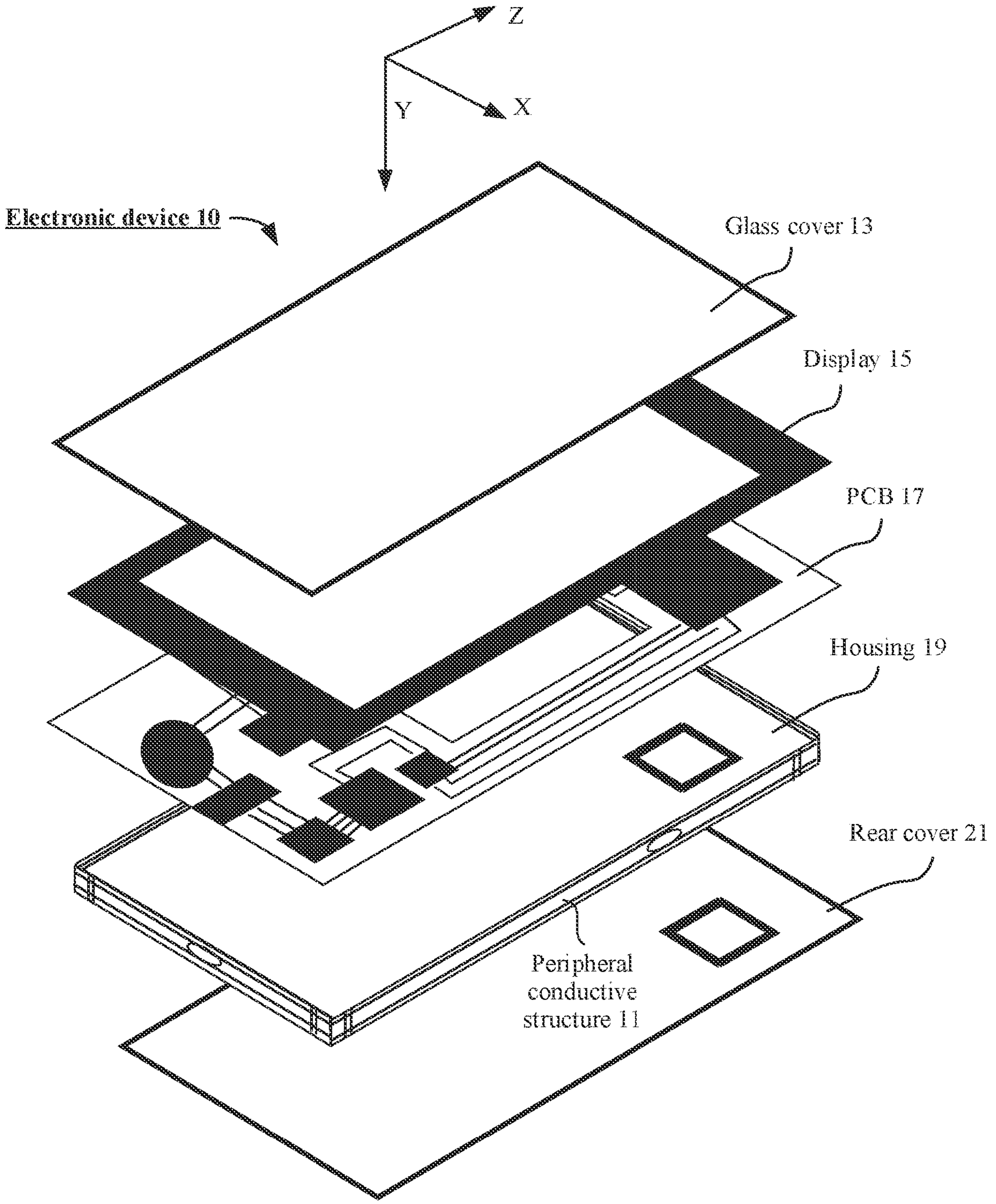
FIG. 1 is a schematic diagram of an electronic device according to an embodiment of this application.

FIG. 1 shows an example of an internal environment of an electronic device on which an antenna design solution provided in this application is based. That the electronic device is a mobile phone is used for description.

As shown in FIG. 1, the electronic device 10 may include a glass cover (glass cover) 13, a display (display) 15, a printed circuit board (printed circuit board, PCB) 17, a housing (housing) 19, and a rear cover (rear cover) 21.

The glass cover 13 may be disposed against the display 15, and may be mainly configured to protect the display 15 against dust.

The printed circuit board PCB 17 may be a flame-retardant (FR-4) dielectric board, or may be a Rogers (Rogers) dielectric board, or may be a hybrid dielectric board of Rogers and FR-4, or the like. Herein, FR-4 is a grade designation for a flame-retardant material, and the Rogers dielectric board is a high frequency board. A metal layer may be disposed on a side that is of the printed circuit board PCB 17 and that is close to the housing 19, and the metal layer may be formed by etching metal on a surface of the PCB 17. The metal layer may be used to ground an electronic element carried on the printed circuit board PCB 17, to prevent an electric shock of a user or device damage. The metal layer may be referred to as a PCB ground. In addition to the PCB ground, the electronic device 10 may further have another ground for grounding, for example, a metal middle frame.

It should be understood that, for the antenna structure, a direct grounding structure may be implemented by using a metal spring or the like, or an indirect grounding structure may be implemented by coupling or the like.

The electronic device 10 may further include a battery, which is not shown herein. The battery may be disposed inside the housing 19. The battery may divide the PCB 17 into a mainboard and a daughter board. The mainboard may be disposed between the housing 19 and an upper edge of the battery, and the daughter board may be disposed between the housing 19 and a lower edge of the battery.

The housing 19 is mainly used to support the entire device. The housing 19 may include a bezel 11, and the bezel 11 may be formed by a conductive material such as metal. The bezel 11 may extend around a periphery of the electronic device 10 and the display 15, and the bezel 11 may specifically surround four sides of the display 15, to help fasten the display 15. In an implementation, the bezel 11 made of the metal material may be directly used as a metal bezel of the electronic device 10 to form a metal bezel appearance, and this is applicable to a metal ID. In another implementation, an outer surface of the bezel 11 may alternatively be a non-metal material, for example, a plastic bezel, to form an appearance of the non-metal bezel, and this is applicable to a non-metal ID.

The rear cover 21 may be a rear cover made of a metal material, or may be a rear cover made of a non-conductive material, such as a glass rear cover or a plastic rear cover.

FIG. 1 shows only some components included in the electronic device 10 as an example, and actual shapes, actual sizes, and actual structures of these components are not limited in FIG. 1.

In recent years, mobile communications have become increasingly important in people's life. In particular, with the advent of an era of a fifth generation (fifth generation, 5G) mobile communication system, a requirement for an antenna is increasingly high. Because space reserved for an antenna in an electronic device is limited, how to implement a MIMO system in compact space becomes an urgent problem to be resolved.

An embodiment of this application provides an antenna structure design solution. Space occupied by a dual-antenna structure is reduced by sharing a same radiator, and isolation between dual antennas is good.

Figure 2:
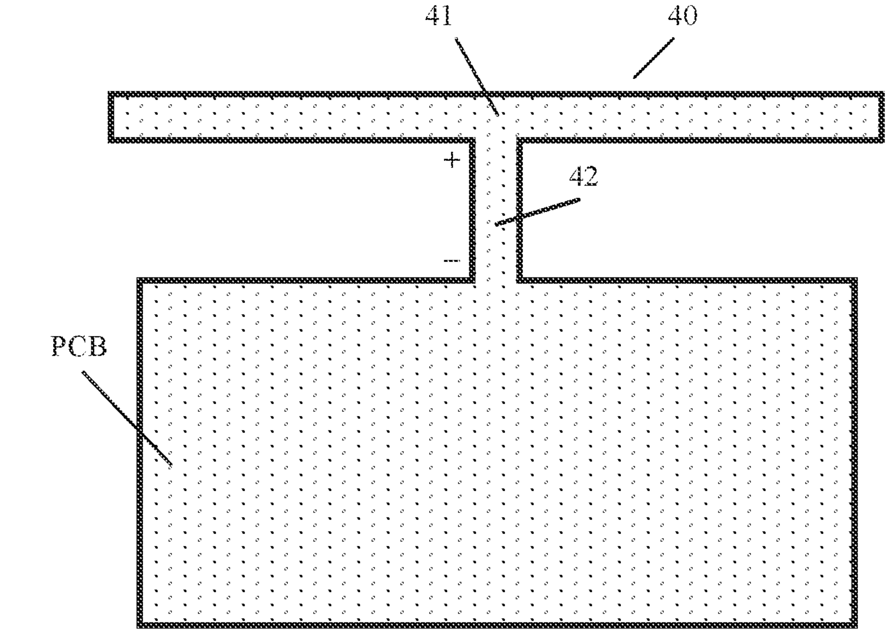
FIG. 2 is a diagram depicting a structure of a common mode wire antenna and distribution of corresponding currents and electric fields according to this application.
Figure 2:
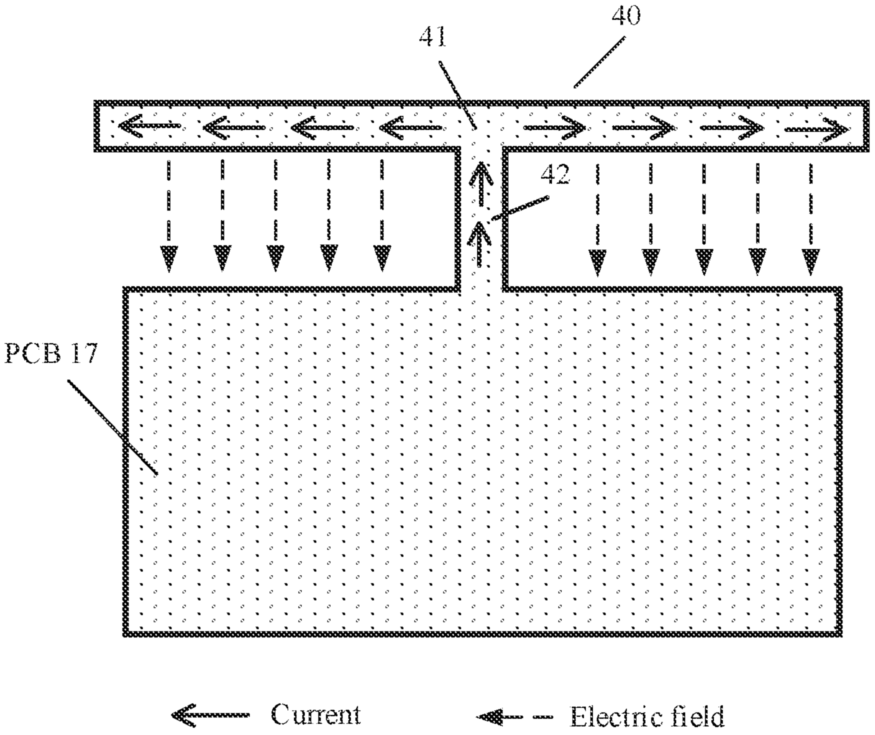
Figure 3:
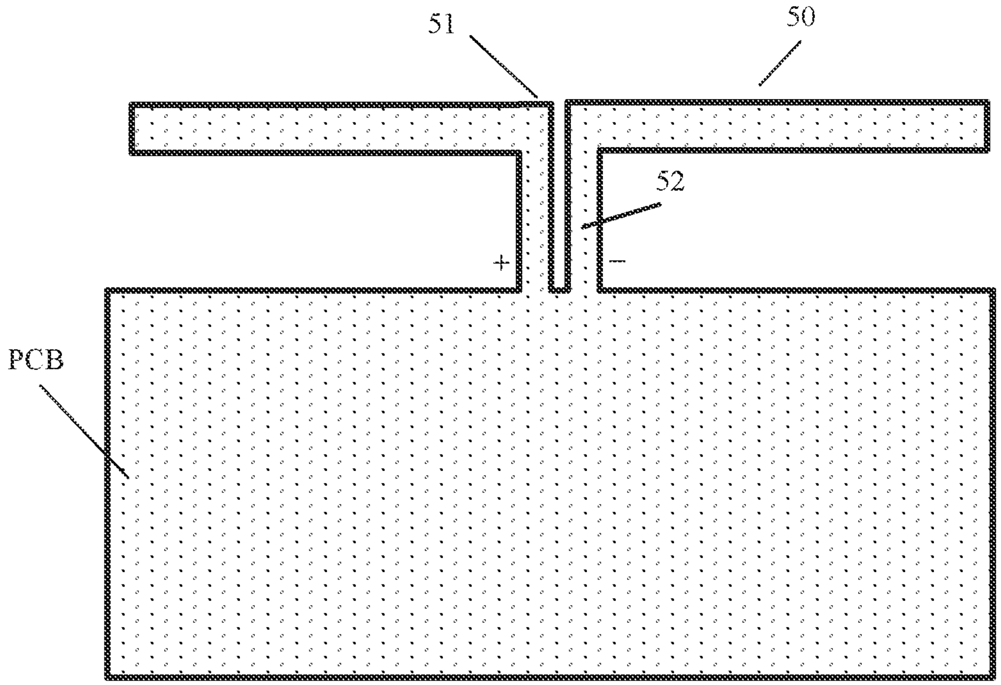
FIG. 3 is a diagram depicting a structure of a differential mode wire antenna and distribution of corresponding currents and electric fields according to this application.
Figure 3:
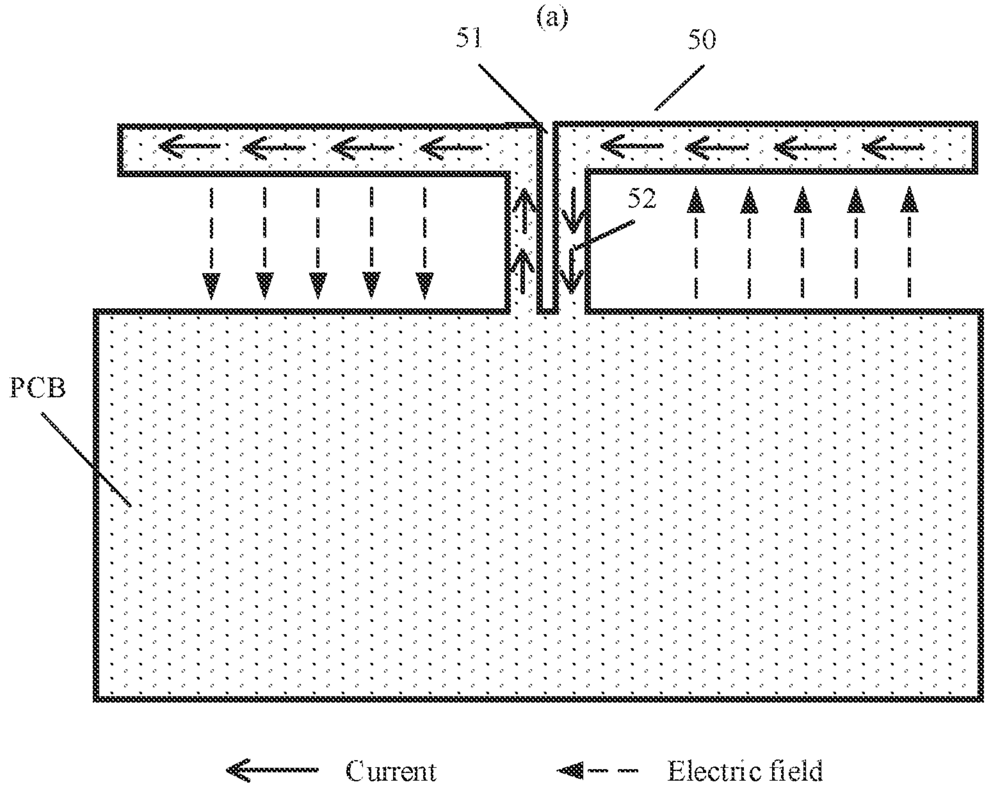

First, FIG. 2 and FIG. 3 are used to describe two antenna modes in this application. FIG. 2 is a schematic diagram depicting a structure of a common mode wire antenna and distribution of corresponding currents and electric fields according to this application. FIG. 3 is a schematic diagram depicting a structure of another differential mode wire antenna and distribution of corresponding currents and electric fields according to this application.

1. Common mode (common mode, CM) mode of a wire antenna

As shown in (a) in FIG. 2, a wire antenna 40 is connected to a feed unit at a middle position 41. A positive electrode of the feed unit is connected to the middle position 41 of the wire antenna 40 by using a feed line 42, and a negative electrode of the feed unit is connected to a ground (for example, a ground plane, which may be a PCB).

(b) in FIG. 2 shows a distribution of currents and electric fields of the wire antenna 40. As shown in (b) in FIG. 2, currents are reversely distributed on two sides of the middle position 41, and are symmetrically distributed. Electric fields are distributed on two sides of the middle position 41, and are codirectionally distributed. As shown in (b) in FIG. 2, currents are codirectionally distributed at the feed line 42. Based on the codirectional distribution of the currents at the feed line 42, such feed shown in (a) of FIG. 2 may be referred to as CM feed of the wire antenna. This wire antenna mode shown in (b) in FIG. 2 may be referred to as the CM mode of the wire antenna. The current and the electric field shown in (b) in FIG. 2 may be respectively referred to as a current and an electric field in the CM mode of the wire antenna.

The current and the electric field in the CM mode of the wire antenna are generated by two horizontal stubs that are on two sides of the middle position 41 and that are of the wire antenna 40 as an antenna operating in a quarter-wavelength mode. The current is strong at the middle position 41 of the wire antenna 40 and weak at both ends of the wire antenna 101. The electric field is weak at the middle position 41 of the wire antenna 40 and strong at both ends of the wire antenna 40.

2. Differential mode (differential mode, DM) mode of a wire antenna

As shown in (a) in FIG. 3, a wire antenna 50 is connected to a feed unit at a middle position 51. A positive electrode of the feed unit is connected to one side of the middle position 51 by using a feed line 52, and a negative electrode of the feed unit is connected to the other side of the middle position 51 by using the feed line 52.

(b) in FIG. 3 shows a distribution of currents and electric fields of the wire antenna 50. As shown in (b) in FIG. 3, currents are in the same direction on two sides of the middle position 51, and are distributed in an anti-symmetric manner. Electric fields are distributed reversely on the two sides of the middle position 51. As shown in (b) in FIG. 3, currents are reversely distributed at the feed line 52. Based on the reverse distribution of the currents at the feed line 52, such feed shown in (a) in FIG. 3 may be referred to as DM feed of the wire antenna. This wire antenna mode shown in (b) in FIG. 3 may be referred to as the DM mode of the wire antenna. The current and the electric field shown in (b) in FIG. 3 may be respectively referred to as a current and an electric field in the DM mode of the wire antenna.

The current and the electric field in the DM mode of the wire antenna are generated by using the entire wire antenna 50 as an antenna operating in a half-wavelength mode. The current is strong at the middle position 51 of the wire antenna 50 and weak at both ends of the wire antenna 50. The electric field is weak at the middle position 51 of the wire antenna 50 and strong at both ends of the wire antenna 50.

Figure 4:
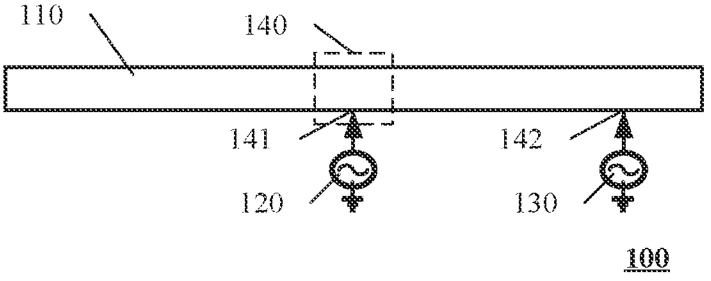
FIG. 4 is a schematic diagram of an antenna structure according to an embodiment of this application.

FIG. 4 is an antenna structure 100 according to an embodiment of this application. The antenna structure shown in FIG. 4 may be applied to the electronic device shown in FIG. 1.

As shown in FIG. 4, the antenna structure 100 may include a first radiator 110, a first feed unit 120, and a second feed unit 130.

The first radiator 110 includes a first feed point 141 and a second feed point 142. The first feed unit 120 feeds the antenna structure 100 at the first feed point 141, and the second feed unit 130 feeds the antenna structure 100 at the second feed point 142. The first feed point 141 is disposed in a central region 140. Distances between all points in the central region 140 and a center of the first radiator 110 are less than one sixteenth of a first wavelength. The first wavelength is a wavelength corresponding to a first resonance generated by the antenna structure 100 when the first feed unit 110 is feeding. The second feed point 142 is disposed between the central region 140 and an end of the first radiator.

It should be understood that the center of the first radiator 110 may be considered as a midpoint of a length of the first radiator 100, and the length herein may be considered as an electrical length. The electrical length may be represented by a ratio of a physical length (that is, a mechanical length or a geometric length) multiplied by transmission time of an electrical or electromagnetic signal in a medium to a time required when the signal in free space passes through a same distance as the physical length in the medium. The electrical length may meet the following formula:

$$\bar{L} = L \times \frac{a}{b},$$

where

L is the physical length, a is the transmission time of the electrical or electromagnetic signal in the medium, and b is the transmission time in free space.

Alternatively, the electrical length may be a ratio of a physical length (that is, a mechanical length or a geometric length) to a wavelength of a transmitted electromagnetic wave, and the electrical length may meet the following formula:

$\bar{L}=L/\lambda$, where

L is the physical length, and λ is the wavelength of the electromagnetic wave.

Alternatively, the center of the first radiator 110 may alternatively be considered as a geometric center of the first radiator 100.

In addition, the wavelength corresponding to the first resonance may be understood as a wavelength corresponding to a resonance point of the first resonance, or a wavelength corresponding to a center frequency of an operating frequency band corresponding to the first resonance. In the following, a wavelength corresponding to a second resonance, a wavelength corresponding to a third resonance, and a wavelength corresponding to a fourth resonance may also be correspondingly understood.

Optionally, when the first feed unit is feeding, the antenna structure may generate a first resonance, and when the second feed unit is feeding, the antenna structure may generate a third resonance.

Optionally, when the first feed unit 120 and the second feed unit 130 are feeding, an operating frequency band of the antenna structure 100 corresponding to the first resonance may be the same as an operating frequency band of the antenna structure 100 corresponding to the third resonance. The antenna structure 100 may be used as dual antennas, and is applicable to a MIMO system.

Optionally, an operating frequency band of the antenna structure 100 corresponding to the first resonance covers 2402 MHz to 2480 MHz, and may correspond to a 2.4 GHz frequency band in wireless fidelity (wireless-fidelity, Wi-Fi).

Optionally; an operating frequency band of the antenna structure 100 corresponding to the third resonance covers 2402 MHz to 2480 MHz, and may correspond to a 2.4 GHz frequency band in Wi-Fi.

It should be understood that the 2.4 GHz Wi-Fi frequency band and the Bluetooth (Bluetooth, BT) frequency band belong to a same frequency. To ensure normal operation of an antenna working in the Wi-Fi frequency band and an antenna working in the BT frequency band, the two may use a same antenna, and use a time-division duplex (time-division duplex, TDD) mode. Therefore, when the first feed unit 120 and the second feed unit 130 are feeding separately, the antenna structure 100 may work in the 2.4 GHz Wi-Fi frequency band and the BT frequency band respectively, or work in the Wi-Fi frequency band and the BT frequency band at the same time in the TDD mode.

Figure 5:
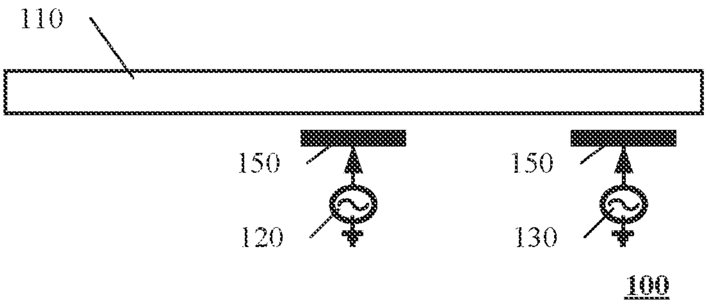
FIG. 5 is a schematic diagram of another antenna structure according to an embodiment of this application.

Optionally, as shown in FIG. 5, the first feed unit 120 may indirectly couple and feed the antenna structure 100 by using a metal part 150, and the second feed unit 130 may indirectly couple and feed the antenna structure 100 by using the metal part 150.

Optionally, the metal part 150 may be a metal spring.

It should be understood that indirect coupling is a concept relative to direct coupling, that is, mid-air coupling, it means that the two are not directly electrically connected. Direct coupling means a direct electrical connection, and direct feeding at a feed point.

Figure 6:
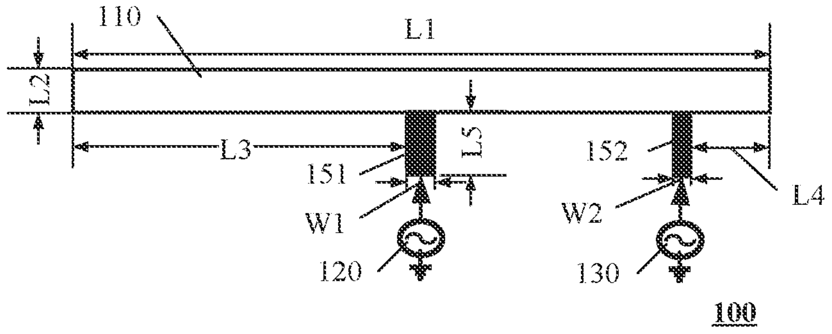
FIG. 6 is a schematic diagram of another antenna structure according to an embodiment of this application.

Optionally, as shown in FIG. 6, the first feed unit 120 may directly feed the antenna structure 100 by using a first feed line 151, and the second feed unit 130 may directly feed the antenna structure 100 by using a second feed line 152.

Optionally, as shown in FIG. 6, a length L1 of the first radiator 110 may be half of the first wavelength. An example in which the operating frequency band corresponding to the first resonance is the 2.4 GHz Wi-Fi frequency band is used for description. This is not limited in this application. The length L1 of the first radiator 110 may be 60 mm.

Optionally, a width L2 of the first radiator 110 may be adjusted according to actual simulation or design. It should be understood that the first radiator 110 may be a long-strip-shaped metal, or may be a metal sheet. This is not limited in this application. For brevity of description, in this embodiment of this application, an example in which the first metal radiator 110 is the long-strip-shaped metal is used for description. The width L2 of the first radiator 110 may be 1 mm.

Optionally, a width W1 of the first feed line 151 may be between 0.1 mm and 2 mm. For brevity of description, in this embodiment of this application, an example in which the width W1 of the feed line 151 is 0.5 mm is used for description.

Optionally; a width W2 of the second feed line 152 may be between 0.1 mm and 2 mm. For brevity of description, in this embodiment of this application, an example in which the width W1 of the second feed line 152 is 1 mm is used for description.

Optionally, the first feed unit 120 may be disposed in a central region, and a distance L3 between the first feed unit 120 and the left end of the first radiator 110 is 27.1 mm.

Optionally, a distance between the second feed point and an end of the first radiator 110 is between three sixteenths to five sixteenths of a second wavelength. The second wavelength is a wavelength corresponding to the second resonance generated by the antenna structure 100 when the first feed unit 120 is feeding. A frequency of a resonance point of the second resonance is greater than a frequency of a resonance point of the first resonance. When the antenna structure 100 is fed by the second feed unit 130, a fourth resonance may be venerated, and a frequency of a resonance point of the fourth resonance is greater than a frequency of a resonance point of a third resonance.

Optionally, a distance between the first feed point and the second feed point is between five sixteenths and eleven sixteenths of the second wavelength. Preferably, the distance between the first feed point and the second feed point is between three eighths and five eighths of the second wavelength.

In the antenna structure provided in this embodiment of this application, the feed points of the antenna structure are arranged in an asymmetric manner, so that design in the electronic device is more flexible.

Optionally, when the first feed unit 120 and the second feed unit 130 are feeding, an operating frequency band of the antenna structure 100 corresponding to the second resonance may be the same as an operating frequency band of the antenna structure 100 corresponding to the fourth resonance. The antenna structure 100 may be used as dual antennas, and is applicable to a MIMO system.

Optionally, an operating frequency band of the antenna structure 100 corresponding to the second resonance may cover a 5G frequency band in Wi-Fi.

Optionally, an operating frequency band of the antenna structure 100 corresponding to the fourth resonance may cover a 5G frequency band in Wi-Fi.

Optionally, as shown in FIG. 6, tar brevity of description, this embodiment of this application is described by using an example in which a second feed point is disposed between a first feed point and a right end part of the first radiator 110. A distance L4 between the second feed point and the right end part of the first radiator 110 is 12 mm.

Optionally, a matching network may be further disposed between the first feed point and the first feed unit, or between the second feed point and the second feed unit, and may be used to suppress a current of another frequency band of the feed point, so that overall performance of the antenna is improved. In addition, the position of the resonance point may also be adjusted.

Figure 7:
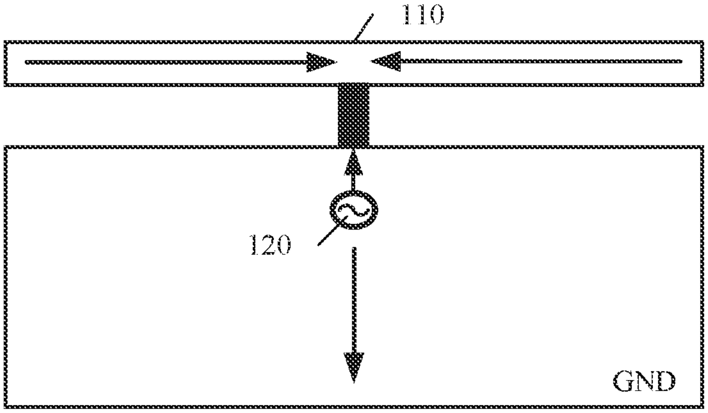
FIG. 7 is a distribution diagram of currents in a first resonance generated by an antenna structure when a first feed unit is feeding.
Figure 8:
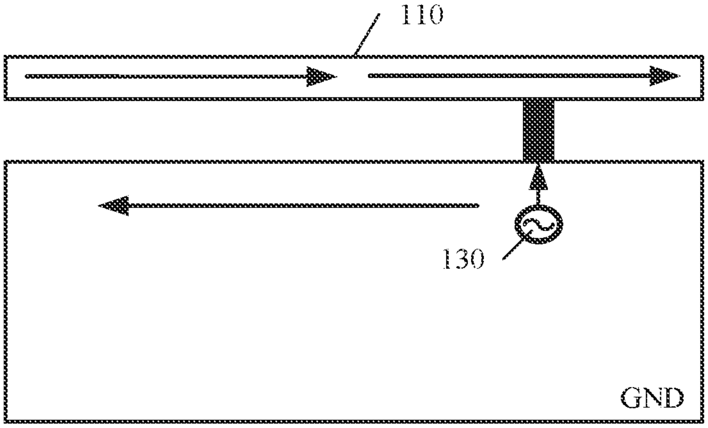
FIG. 8 is a distribution diagram of currents in a third resonance generated by an antenna structure when a second feed unit is feeding.
Figure 9:
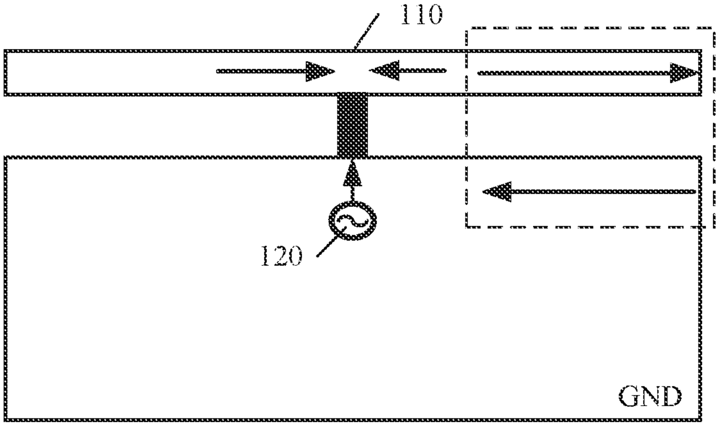
FIG. 9 is a distribution diagram of currents in a second resonance generated by an antenna structure when a first feed unit is feeding.
Figure 10:
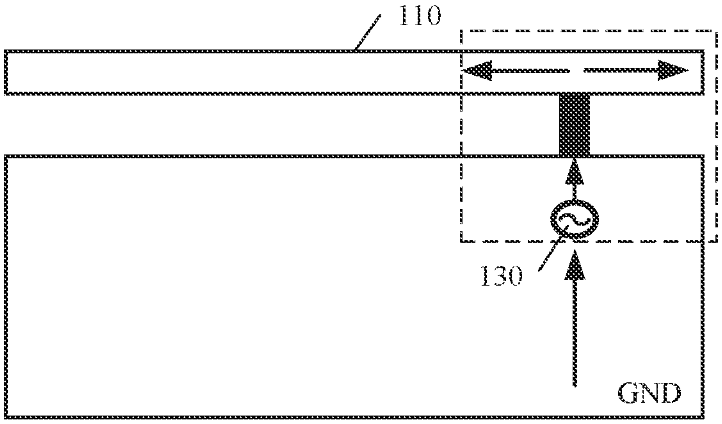
FIG. 10 is a distribution diagram of currents in a fourth resonance generated by an antenna structure when a second feed unit is feeding.

FIG. 7 to FIG. 10 are distribution schematic diagrams of currents of an antenna structure when a feed unit is feeding. FIG. 7 is a distribution diagram of currents in a first resonance generated by an antenna structure when a first feed unit is feeding. FIG. 8 is a distribution diagram of currents in a third resonance generated by an antenna structure when a second feed unit is feeding. FIG. 9 is a distribution diagram of currents in a second resonance generated by an antenna structure when a first feed unit is feeding. FIG. 10 is a distribution diagram of currents in a fourth resonance generated by an antenna structure when a second feed unit is feeding.

It should be understood that FIG. 7 to FIG. 10 are schematic diagrams of simulation results of an antenna structure corresponding to FIG. 6. In this embodiment of this application, an example in which a teed unit is disposed on a PCB of an electronic device is used for description. An example in which a reference ground is a metal plated layer (PCB ground) in the PCB is used for description of a grounding structure of the antenna structure at the feed point, or a reference ground may be a housing (metal middle frame) of the electronic device. This is not limited in this application. The first resonance and the third resonance may be in the first operating frequency band of the antenna structure, and may correspond to the 2.4 GHz frequency band in Wi-Fi. The second resonance and the fourth resonance may be in the second operating frequency band of the antenna structure, and may correspond to the 5G frequency band in Wi-Fi.

Optionally, a distance between the antenna structure and the PCB may be adjusted according to an actual design. In this embodiment of this application, an example in which the distance between the antenna structure and the PCB is 3 mm is used for description. To be specific, a length L5 of the first feed line and the second feed line in FIG. 6 is 3 mm.

As shown in FIG. 7, when the first feed unit 120 is feeding, the antenna structure generates a first resonance, currents excited by the first radiator 110 are opposite on two sides of a feed point, and currents on a ground (ground, GND) are distributed longitudinally, that is, the current flows from an end of the first radiator 110 to a lower end of the GND. For this current distribution, the antenna structure may be equivalent to a vertical long dipole antenna. For the equivalent vertical long dipole antenna, a connection point (a first feed point) between the first feed unit 110 and the first radiator 110 is located in a central region of the equivalent vertical long dipole antenna. Electrical lengths of the first radiator 110 on both sides of the first feed point may be approximately a wavelength corresponding to one quarter of the first resonance, and current distribution of the other quarter of the wavelength may be on the GND.

As shown in FIG. 8, when the second feed unit 130 is feeding, the antenna structure generates a third resonance, and currents excited on the first radiator 110 are in a same direction on two sides of the feed point, that is, the current flows from one end of the first radiator 110 to the other end of the first radiator 110. Because an electrical length of the first radiator 110 may be approximately a wavelength corresponding to half of the third resonance, the first radiator 110 is equivalent to a parallel half-wavelength dipole. Reverse horizontally distributed currents are generated on the GND.

As shown in FIG. 7 and FIG. 8, when the first feed unit is feeding, the antenna structure may work in a CM mode, and when the second feed unit is feeding, the antenna structure may work in a DM mode.

As shown in FIG. 7 and FIG. 8, when the first feed unit and the second feed unit are feeding, currents excited on the GND are orthogonal. In addition, when the second feed unit is feeding, an excited electric field is close to zero in a central region of a radiator, and a voltage between the radiator and the GND in this region is also close to zero. Therefore, a current on the first radiator in FIG. 8 enters the GND from a feed point of the first feed unit in FIG. 7. Therefore, two antenna structures corresponding to the first feed unit and the second feed unit may share a same radiator, and relatively good isolation between the two antennas is maintained.

In addition, when the first feed unit and the second feed unit are feeding at the same time, the antenna structure may work in the CM mode and the DM mode respectively, and corresponding electric fields generated by the antenna structure are integrally orthogonal in a far field. Integral orthogonality may be understood as that an electric field that generates a resonance in the CM mode and the DM mode meets the following formula, in the far field:

$$\iint E_1(\theta,\varphi)\cdot E_2(\theta,\varphi)d\theta d\varphi=0, \text{ where}$$

$E_1(\theta, \phi)$ is a far-field electric field corresponding to the first resonance generated by the antenna structure when the first feed unit is feeding, and corresponds to the CM mode. $E_2(\theta, \phi)$ is a far-field electric field corresponding to the third resonance generated by the antenna structure when the second feed unit is feeding, and corresponds to the DM mode.

The electric fields corresponding to the resonance generated in the CM mode and the DM mode are integrally orthogonal between the far fields, and do not affect each other. Therefore, there is good isolation between the first feed unit and the second feed unit.

In this case, because there is good isolation between the first feed unit and the second feed unit, the first feed unit and the second feed unit may work at the same time. In other words, the two feed units of the antenna structure may simultaneously perform receiving and sending, or simultaneously perform sending or receiving, so that the antenna structure can meet a requirement of the MIMO system. The antenna structure provided in this embodiment of this application may be used as a co-radiator dual-antenna structure, to meet a MIMO requirement.

However, for the second resonance and the fourth resonance in the second operating frequency band, because an operating frequency of the corresponding antenna structure increases compared with a frequency corresponding to the first operating frequency band in which the first resonance and the third resonance are located, it can be learned from the foregoing formula of the electrical length that, because a resonant frequency hand increases, a corresponding operating wavelength is shortened, and a physical length of the first radiator remains unchanged. In this case, an equivalent electrical length of the first radiator increases, and a current distribution also changes accordingly. It may be considered that a working mode corresponding to the first resonance and the third resonance generated by the antenna structure is a fundamental mode and corresponds to the first operating frequency band, and a working mode corresponding to the second resonance and the fourth resonance generated by the antenna structure is a high-order mode and corresponds to the second operating frequency band.

As shown in FIG. 9, when the first feed unit 120 is feeding, the antenna structure generates a second resonance. Compared with FIG. 7, although common-mode currents are distributed on two sides of the first feed point, because an equivalent electrical length of the first radiator 110 increases, a current distributed on the right side of the first feed point is an operating wavelength corresponding to three fourths of a second resonance, and a half-wavelength horizontal induced current is generated on GND.

As shown in FIG. 10, when the second feed unit 130 is feeding, the antenna structure generates a fourth resonance. Compared with FIG. 8, an equivalent electrical length on the right side of the second feed point increases, to reach a wavelength corresponding to one quarter of the fourth resonance. In this case, reverse currents are excited on two sides of the second feed point, and a longitudinal current is excited on GND.

As shown in FIG. 9 and FIG. 10, in a region shown by a dashed box, when the first feed unit is feeding, the antenna structure may work in a DM mode, and when the second feed unit is feeding, the antenna structure may work in a CM mode. When the first feed unit and the second feed unit are feeding, currents on the GND are orthogonal, and a feed point in the CM mode is located in an electric field null region in the DM mode. In addition, resonant electric fields generated in the CM mode and the DM mode are orthogonal in far field. Therefore, two antenna structures corresponding to the first feed unit and the second feed unit may share a same radiator, and relatively good isolation between the two antennas is maintained.

Figure 11:
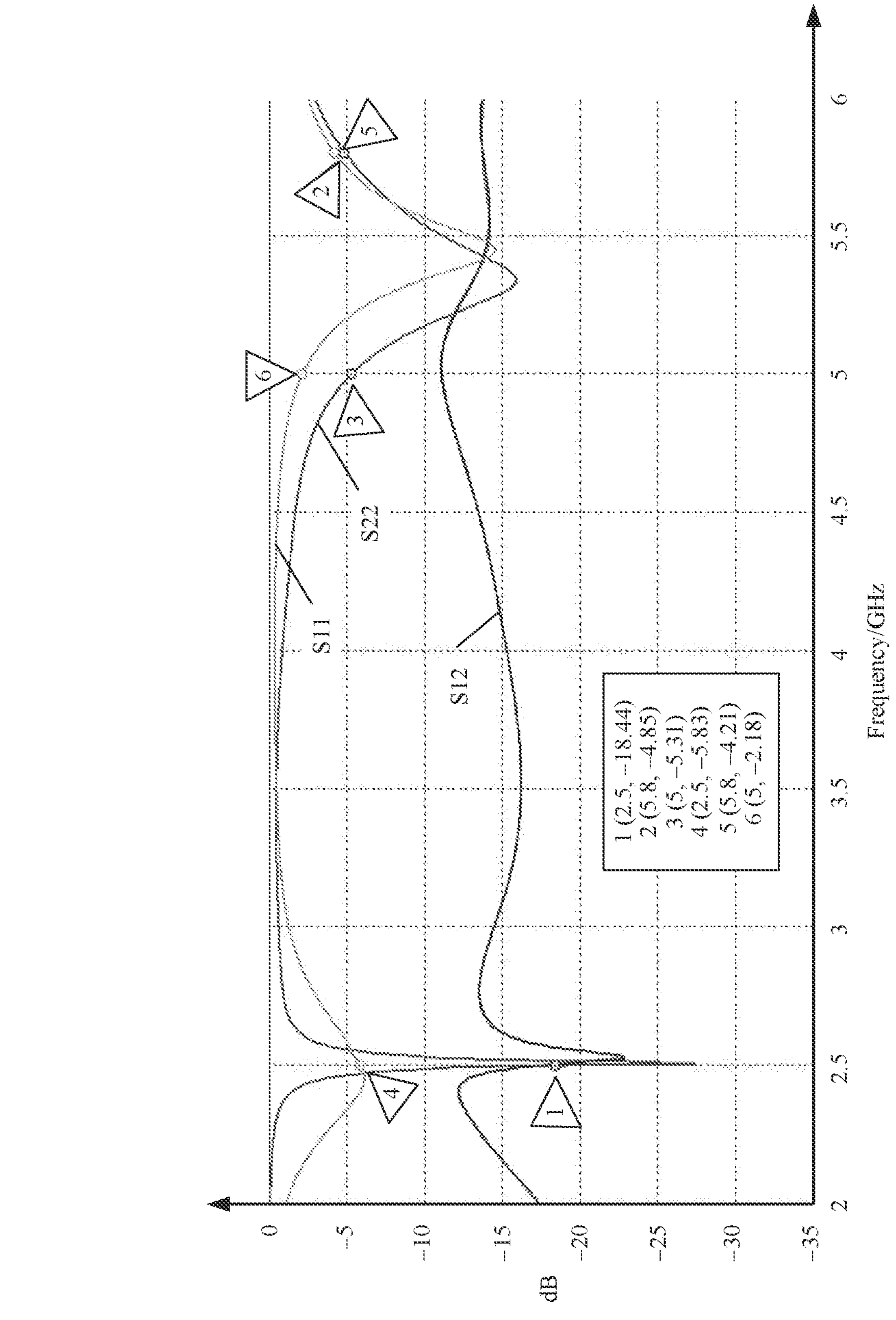
FIG. 11 is a simulation diagram of an S parameter of the antenna structure shown in FIG. 6.
Figure 12:
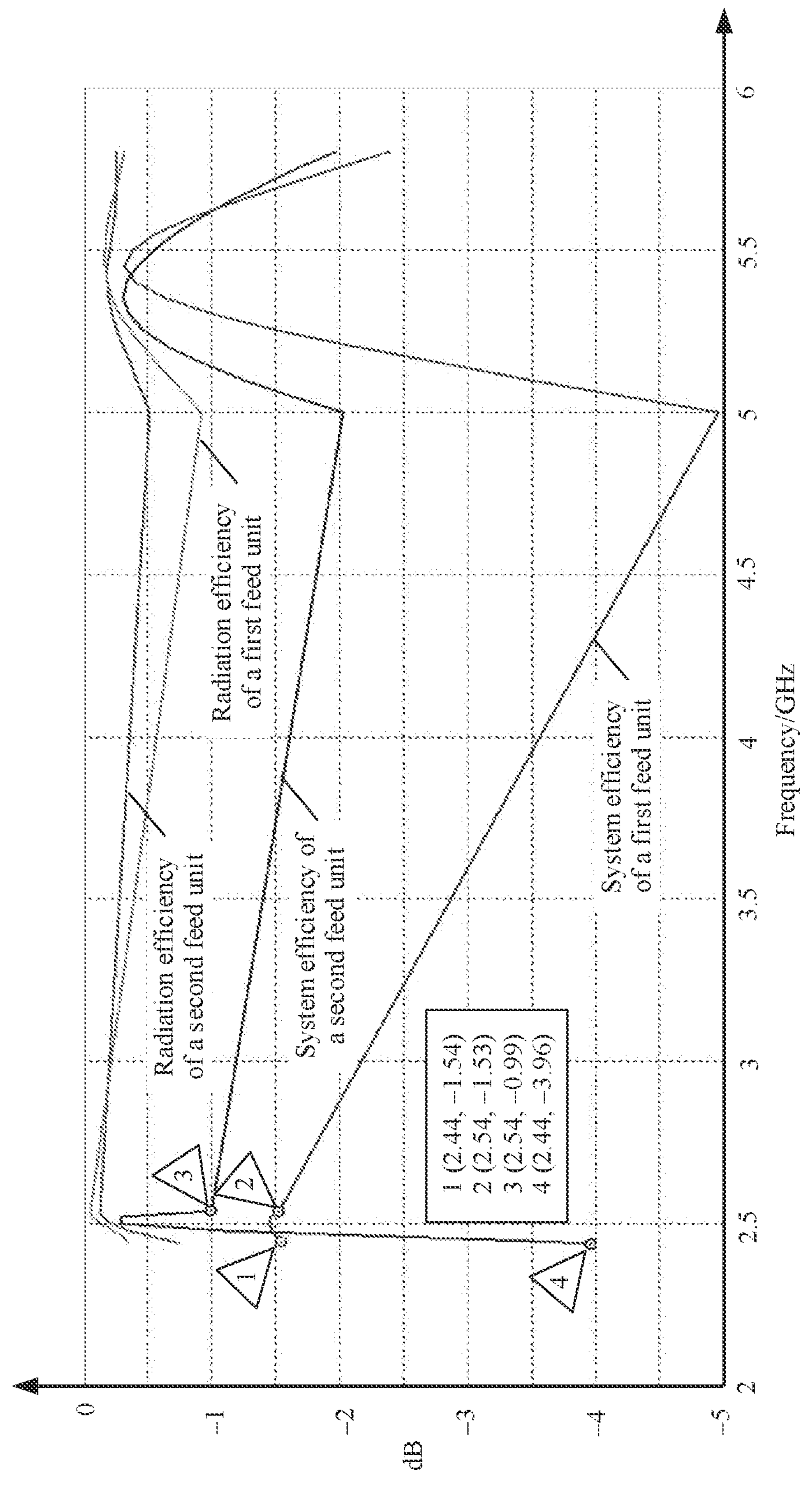
FIG. 12 is a simulation diagram of efficiency of the antenna structure shown in FIG. 6.
Figure 13:
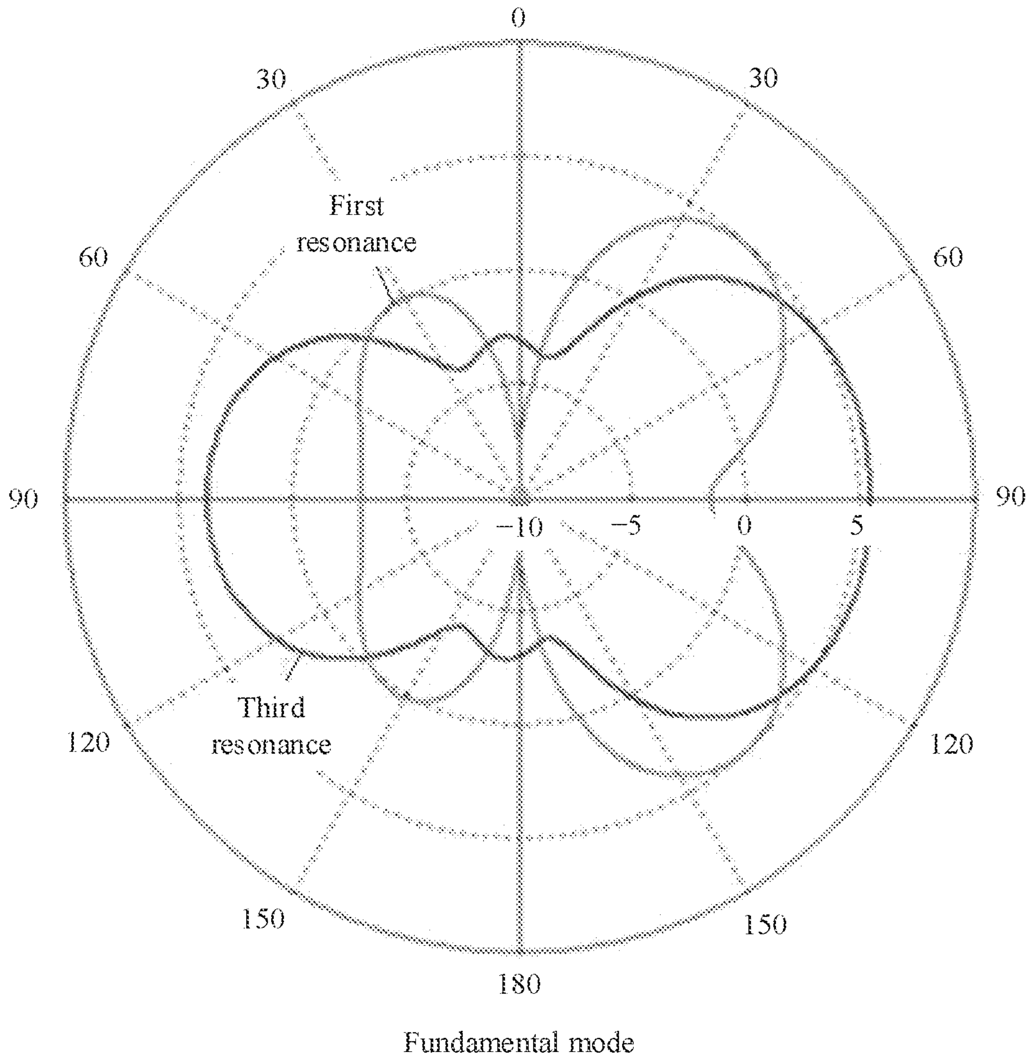
FIG. 13 is a pattern corresponding to a fundamental mode of the antenna structure shown in FIG. 6.
Figure 14:
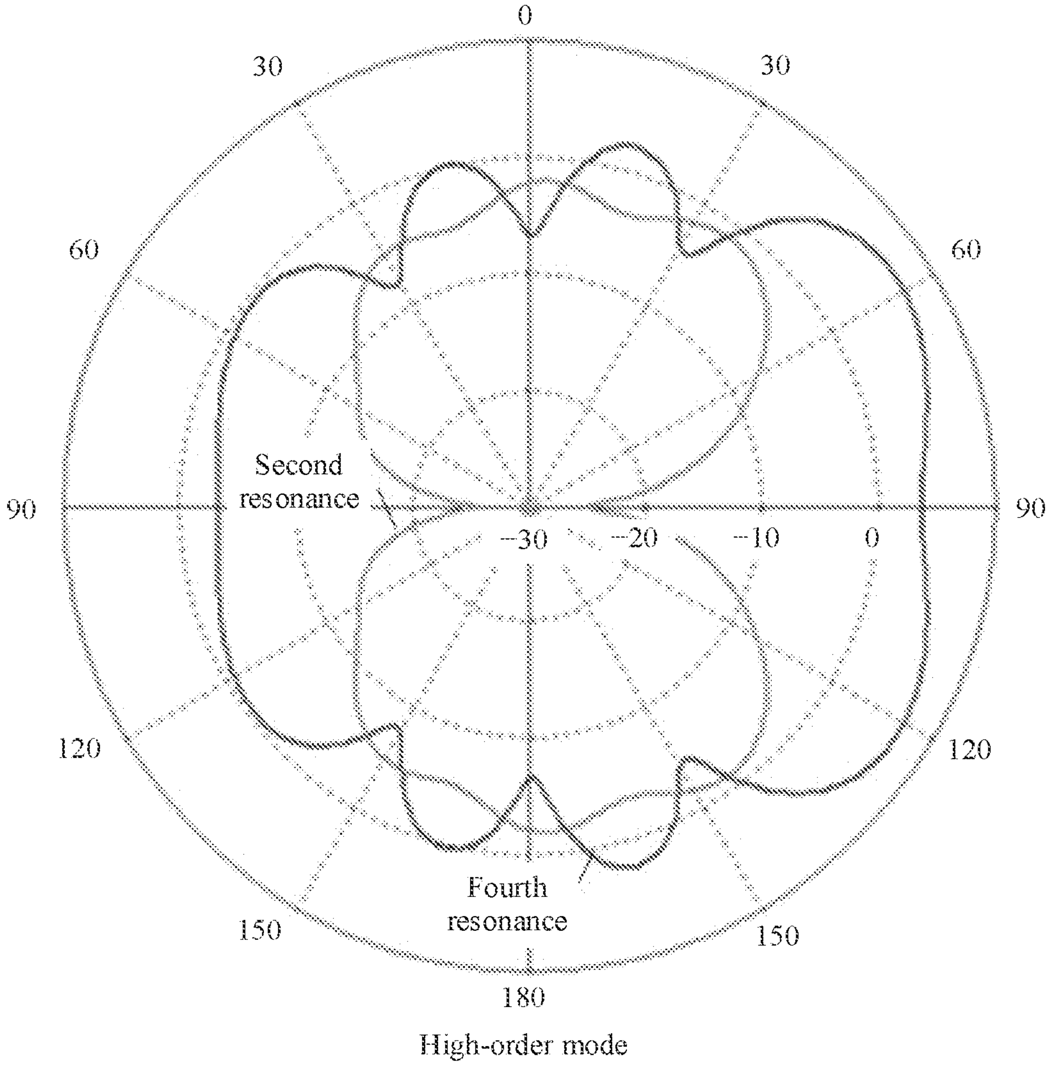
FIG. 14 is a pattern corresponding to a high-order mode of the antenna structure shown in FIG. 6.

FIG. 11 to FIG. 14 are diagrams of a simulation result corresponding to the antenna structure shown in FIG. 6. FIG. 11 is a simulation diagram of an S parameter of the antenna structure shown in FIG. 6. FIG. 12 is a simulation diagram of efficiency of the antenna structure shown in FIG. 6. FIG. 13 is a pattern corresponding to a fundamental mode of the antenna structure shown in FIG. 6. FIG. 14 is a pattern corresponding to a high-order mode of the antenna structure shown in FIG. 6.

As shown in FIG. 11, both operating frequency bands of dual antennas corresponding to the antenna structure may cover a 2.4 GHz frequency band and a 5G frequency band in Wi-Fi. In addition, isolation between a first feed point and a second feed point is good. The antenna structure provided in this embodiment of this application may be used as a co-radiator dual-antenna structure, to meet a MIMO requirement.

As shown in FIG. 12, a simulation result includes radiation efficiency (radiation efficiency) and system efficiency (total efficiency). In a corresponding operating frequency band, the radiation efficiency and the system efficiency may also meet a requirement.

As shown in FIG. 13 and FIG. 14, when a first feed unit and a second feed unit are feeding, generated currents are orthogonal on GND. Therefore, a corresponding pattern also presents an orthogonal characteristic. To be specific, a first pattern generated by the antenna structure when the first feed unit is feeding at the first feed point and a second pattern generated by the antenna structure when the second feed unit is feeding at the second feed point are complementary, and maximum gain directions of the antenna structure are orthogonal. The antenna structure provided in embodiments of this application is omnidirectional, and may be used in an antenna switching solution. For example, the antenna structure works in a Wi-Fi frequency band, and one of dual antennas may be selected as a communication antenna based on strength of a Wi-Fi signal.

Figure 15:
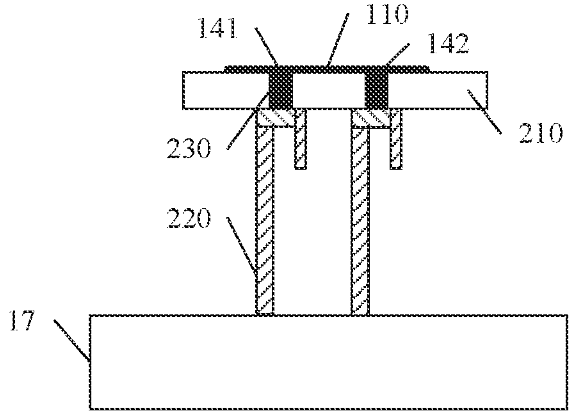
FIG. 15 is a schematic diagram of a feed structure according to an embodiment of this application.

FIG. 15 is a schematic diagram of a feed structure according to an embodiment of this application.

As shown in FIG. 15, the electronic device may further include an antenna support 210.

The first radiator 110 may be disposed on a surface of the antenna support 210. A first feed unit and a second feed unit may be disposed on the PCB 17, and may be electrically connected to the first radiator 110 at the feed point 140 by using a spring 220.

Optionally, the spring 220 may be coupled to the first radiator 110 at the first teed point 141 or the second feed point 142, or may be electrically connected to the first radiator 110 at the first feed point 141 or the second feed point 142 through a metal through hole 230 directly.

Optionally, the first feed unit and the second teed unit may be power chips in the electronic device. It should be understood that the first feed unit and the second feed unit may be two different radio frequency channels in a same power chip, or may be two different power chips. This is not limited in this application.

Optionally; the first radiator 110 may be disposed on a bezel or a rear cover of the electronic device, and may be implemented by using laser-direct-structuring (laser-direct-structuring, LDS), flexible circuit board (flexible printed circuit, FPC) printing, floating metal (floating metal, FLM), or the like. A location at which the antenna structure provided in this application is disposed is not limited in this embodiment of this application.

Figure 16:
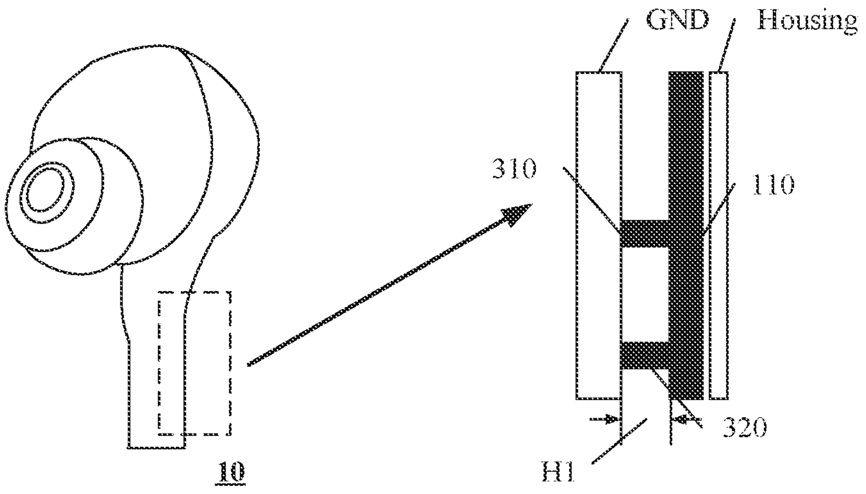
FIG. 16 is a schematic diagram of a structure of an electronic device 10 according to an embodiment of this application.
Figure 17:
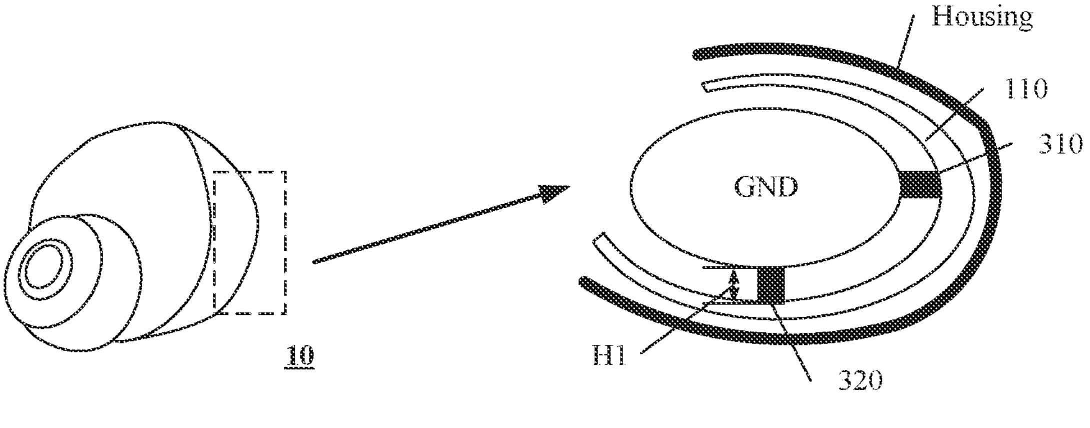
FIG. 17 is a schematic diagram of a structure of an electronic device 10 according to an embodiment of this application.

FIG. 16 and FIG. 17 are schematic diagrams of a structure of an electronic device 10 according to an embodiment of this application.

As shown in FIG. 16 and FIG. 17, the electronic device 10 may be a earphone. FIG. 16 corresponds to a earphone having an ear rod, and FIG. 17 corresponds to a bean type earphone without an ear rod.

As shown in FIG. 16 and FIG. 17, the earphone 10 may include the antenna structure in the foregoing embodiments. The first radiator 110 may be disposed along a housing of the earphone 10. To prevent a human ear from absorbing a signal of an electromagnetic wave, which affects a radiation characteristic of the antenna structure, the antenna structure may be disposed along a side that is of the housing and that is away from the human ear.

As shown in FIG. 16, the first radiator 110 may be electrically connected to a first feed unit by using a first metal copper column 310, or may be electrically connected to a second feed unit by using a second metal copper column 320. A metal component such as a PCB or a battery in the earphone 10 may be used as a GND of the antenna structure. It should be understood that a similar structure may be used in the earphone shown in FIG. 17.

Optionally, as shown in FIG. 16, the first radiator 110 may be straight-line-shaped or nearly straight-line-shaped, and may be disposed along an ear rod part of the earphone 10.

Optionally, as shown in FIG. 17, the first radiator 110 may be C-shaped, or may be fold-line-shaped, and may be disposed along a housing of the bean type earphone 10.

It should be understood that a shape of the first radiator 110 is not limited in this embodiment of this application.

Optionally, for example, a distance between the first radiator 110 and the GND may be 3 mm, that is, a height of the first metal copper column 310 or the second metal copper column 320 is 3 mm.

The antenna structure provided in this embodiment of this application has a small size, and may be applied to an electronic device of an extremely small size, such as a earphone.

Figure 18:
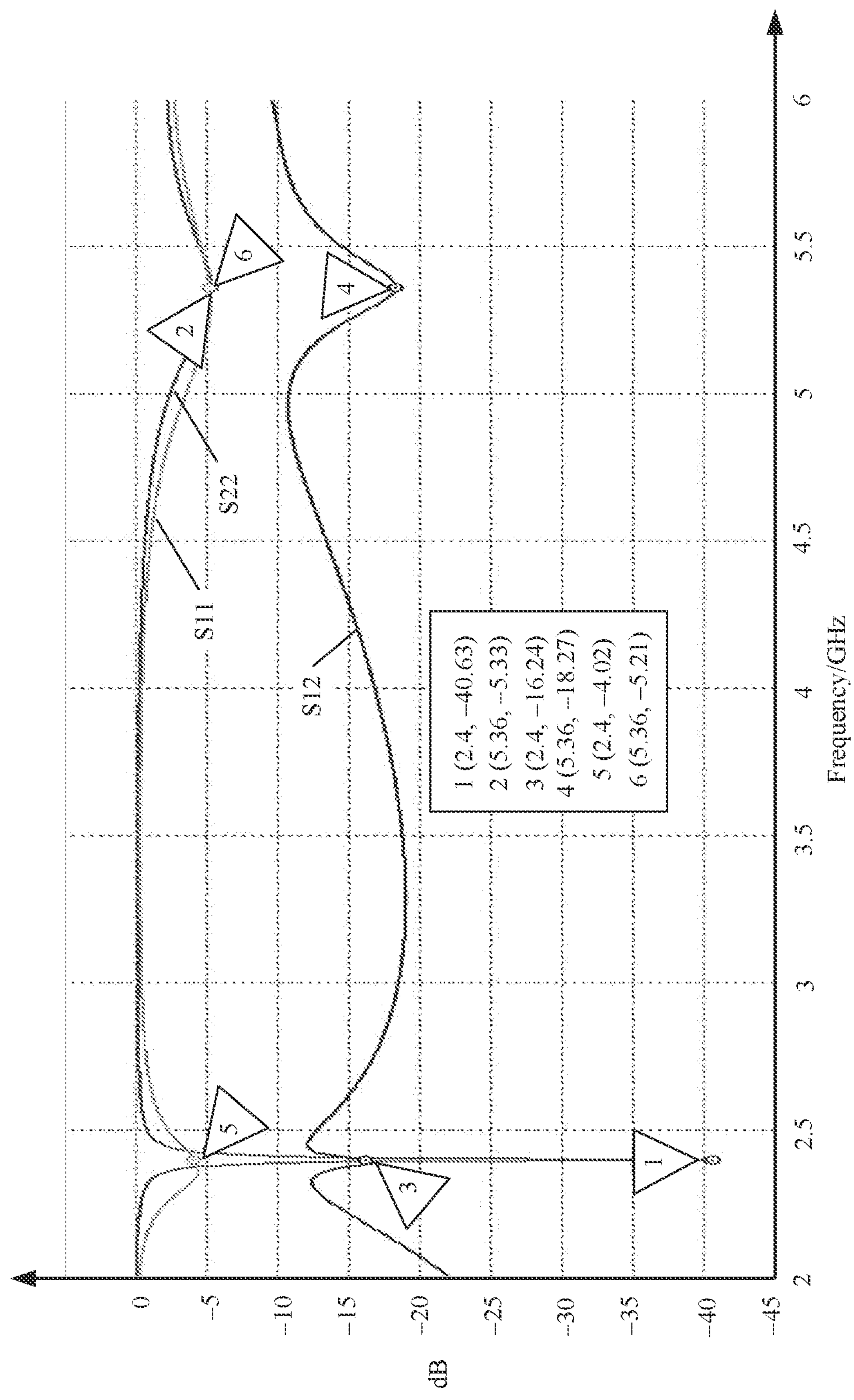
FIG. 18 is a simulation diagram of an S parameter of the antenna structure shown in FIG. 16.
Figure 19:
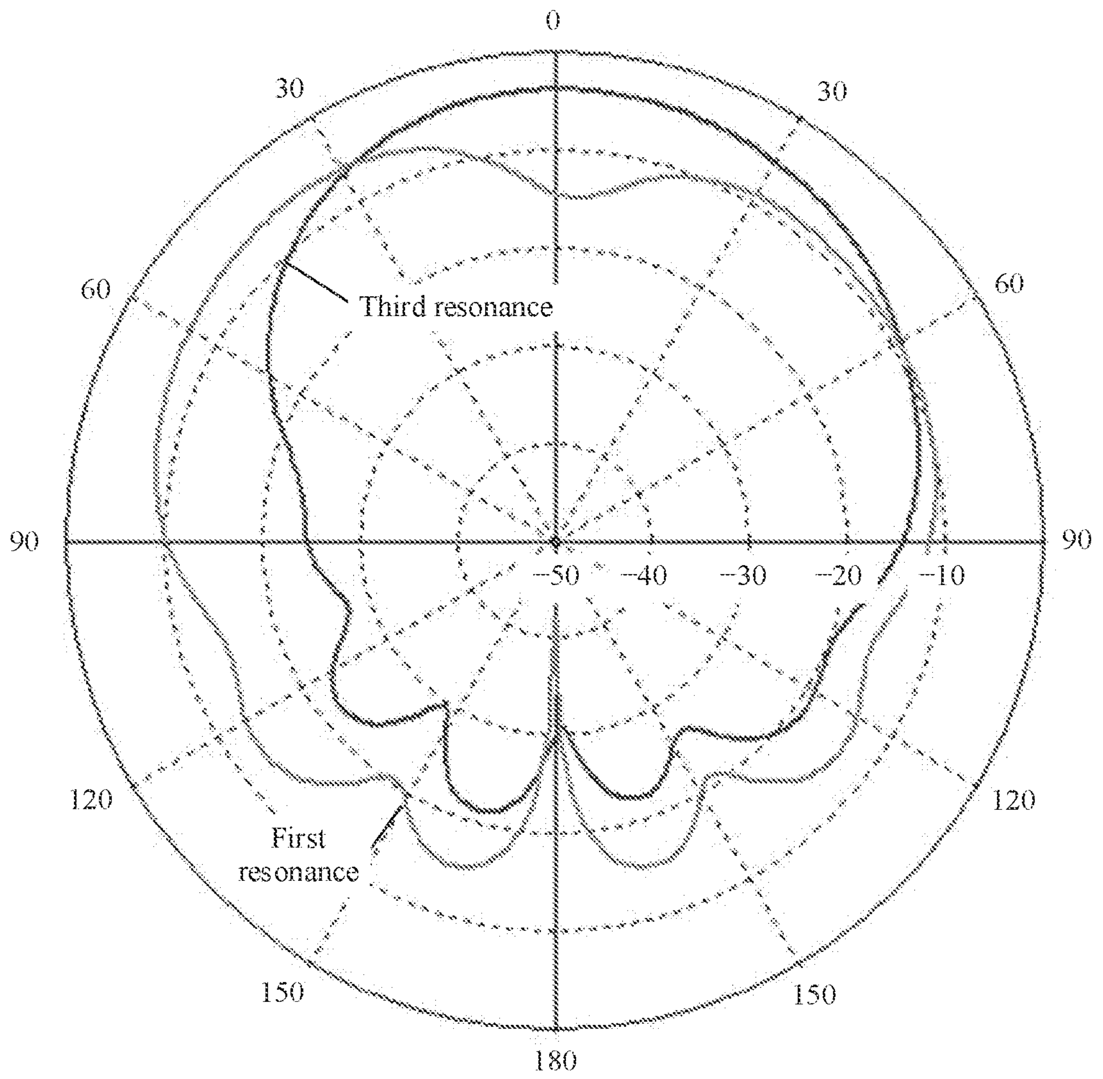
FIG. 19 is a pattern corresponding to a fundamental mode of the antenna structure shown in FIG. 16.
Figure 20:
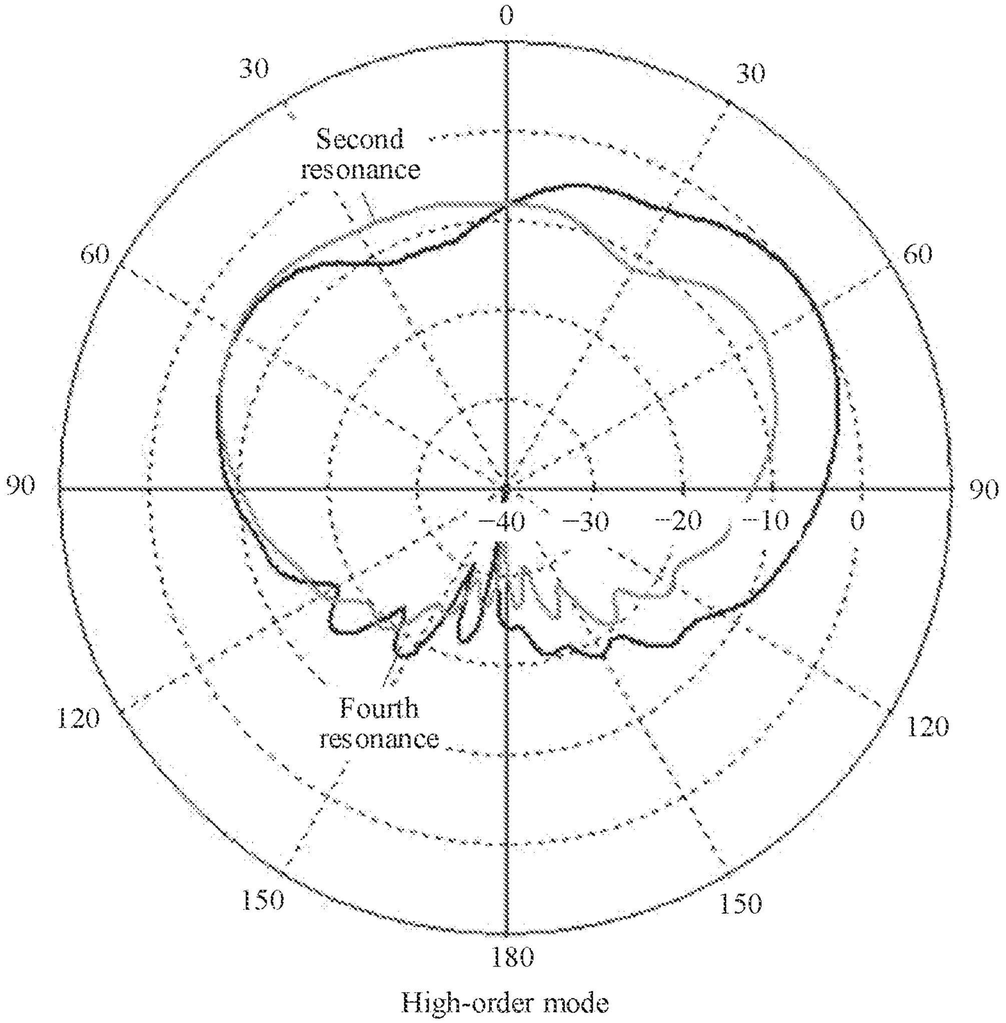
FIG. 20 is a pattern corresponding to a high-order mode of the antenna structure shown in FIG. 16.

FIG. 18 to FIG. 20 are diagrams of a simulation result corresponding to the antenna structure shown in FIG. 16. FIG. 18 is a simulation diagram of an S parameter of the antenna structure shown in FIG. 16. FIG. 19 is a pattern corresponding to a fundamental mode of the antenna structure shown in FIG. 16. FIG. 20 is a pattern corresponding to a high-order mode of the antenna structure shown in FIG. 16.

It should be understood that FIG. 18 to FIG. 20 are diagrams of a simulation result of a earphone disposed in a human ear.

As shown in FIG. 18, both operating frequency bands of dual antennas corresponding to the antenna structure may cover a 2.4 GHz frequency band and a 5G frequency band in Wi-Fi. In addition, isolation between a first feed point and a second feed point is good. The antenna structure provided in this embodiment of this application may be used as a co-radiator dual-antenna structure, to meet a MIMO requirement.

As shown in FIG. 19 and FIG. 20, when a first feed unit and a second feed f it are feeding, generated currents are orthogonal on GND. Therefore, a corresponding pattern also presents an orthogonal characteristic. Therefore, the antenna structure provided in embodiments of this application is omnidirectional, and may be used in an antenna switching solution. For example, the antenna structure works in a Wi-Fi frequency band, and one of dual antennas may be selected as a communication antenna based on strength of a Wi-Fi signal.

It should be understood that, for the earphone, the antenna structure provided in embodiments of this application may be used as dual antennas. One antenna may be applied to a Wi-Fi frequency band, and the other antenna may be applied to a BT frequency band.

Figure 21:
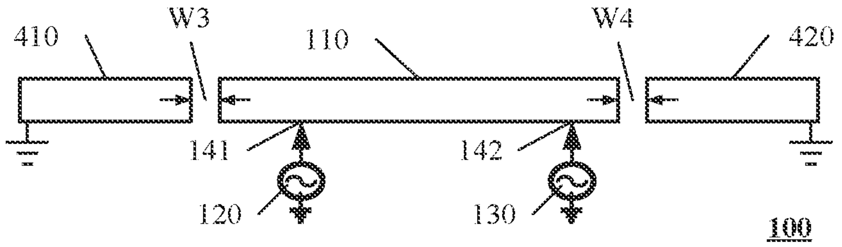
FIG. 21 is a schematic diagram of another antenna structure according to an embodiment of this application.

FIG. 21 is a schematic diagram of an antenna structure according to an embodiment of this application.

As shown in FIG. 21, the antenna structure 100 may further include a second radiator 410.

The second radiator 410 may be disposed on a side that is of the first radiator 110 and that is away from the second feed point 142, a gap is formed between the second radiator 410 and the first radiator 110, and the second radiator 410 may be grounded at an end that is away from the first radiator 110.

It should be understood that the antenna structure provided in this embodiment of this application is a monopole antenna, and an end of the first radiator 110 is in an open (open) state. When a grounded metal is close to the end of the first radiator 110, a distributed capacitor, that is, capacitive loading, is formed, which is equivalent to connecting a capacitor in parallel to the end of the first radiator 110. In this way, a length of the first radiator 110 can be shortened.

Optionally, the antenna structure 100 may further include a third radiator 420.

The third radiator 420 may be disposed on a side that is of the first radiator 110 and that is close to the second feed point 142, a gap is formed between the third radiator 420 and the first radiator 110, and the third radiator 420 may be grounded at an end that is away from the first radiator 110.

It should be understood that additionally disposing the third radiator 420 in the antenna structure 100 may further shorten the length of the first radiator 110. In addition, a size of a loaded capacitor of the antenna structure may be controlled by adjusting a width W3 of the gap between the first radiator 110 and the second radiator 410 or a width W4 of the gap between the first radiator 110 and the third radiator 420. The wider the gap is, the smaller a capacitance of the loaded capacitor is.

Optionally, when the antenna structure 100 includes the second radiator 410 and the third radiator 420, a physical length of the antenna structure 100 may be effectively shortened. In this case, a distance between the first feed point and the second feed point may be between three eighths to five eighths of a second wavelength, so that the antenna structure 100 generates a first operating frequency band and a second operating frequency band and maintains good isolation.

It should be understood that, because the second radiator 410 and the third radiator 420 are equivalent to capacitors, a same effect may also be achieved by connecting the first capacitor and the second capacitor in parallel at two ends of the first radiator 110. The physical length of the first radiator 110 may be adjusted by adjusting capacitance values of the first capacitor and the second capacitor. This is not limited in this application.

The second radiator 410 and the third radiator 420 may be disposed on a surface of an antenna support (not shown).

Optionally, the second radiator 410 and the third radiator 420 may be disposed on a bezel or a rear cover of the electronic device, and may be implemented by using laser-direct-structuring (laser-direct-structuring, LDS), flexible circuit board (flexible printed circuit, FPC) printing, floating metal (floating metal, FLM), or the like. A location at which the antenna structure provided in this application is disposed is not limited in this embodiment of this application.

Figure 22:
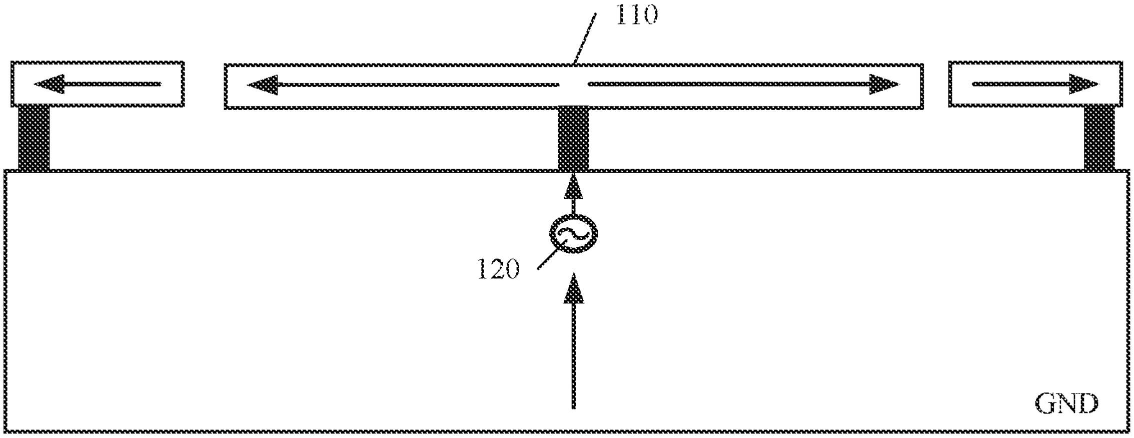
FIG. 22 is a distribution diagram of currents in a first resonance generated by the antenna structure shown in FIG. 21.
Figure 23:
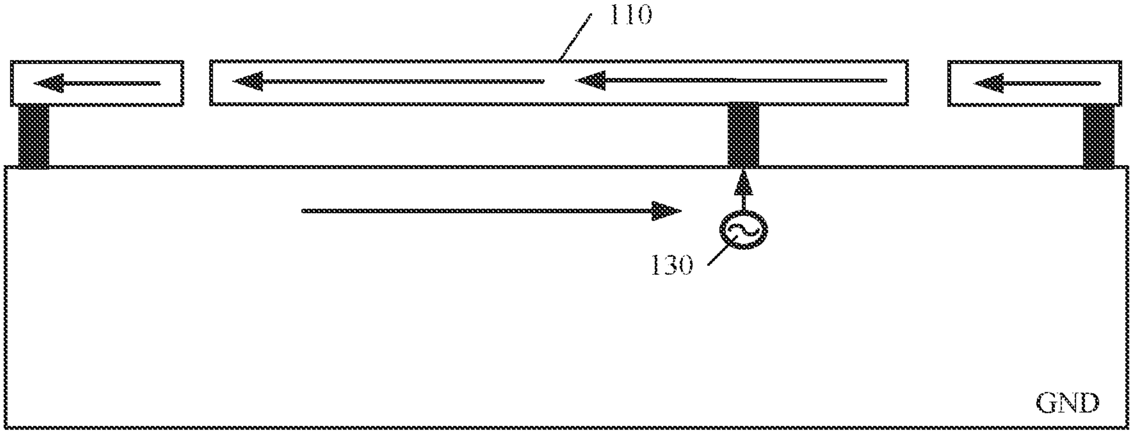
FIG. 23 is a distribution diagram of currents in a third resonance generated by the antenna structure shown in FIG. 21.
Figure 24:
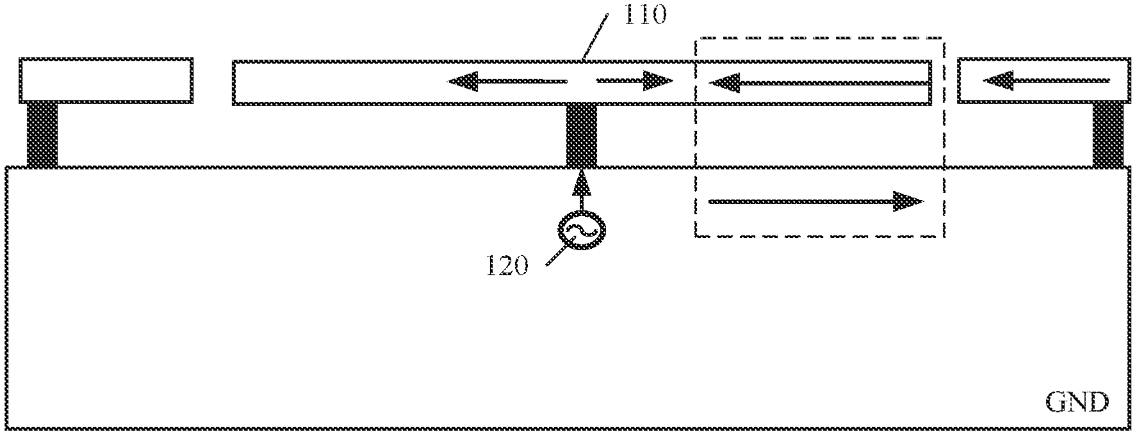
FIG. 24 is a distribution diagram of currents in a second resonance generated in the antenna structure shown in FIG. 21.
Figure 25:
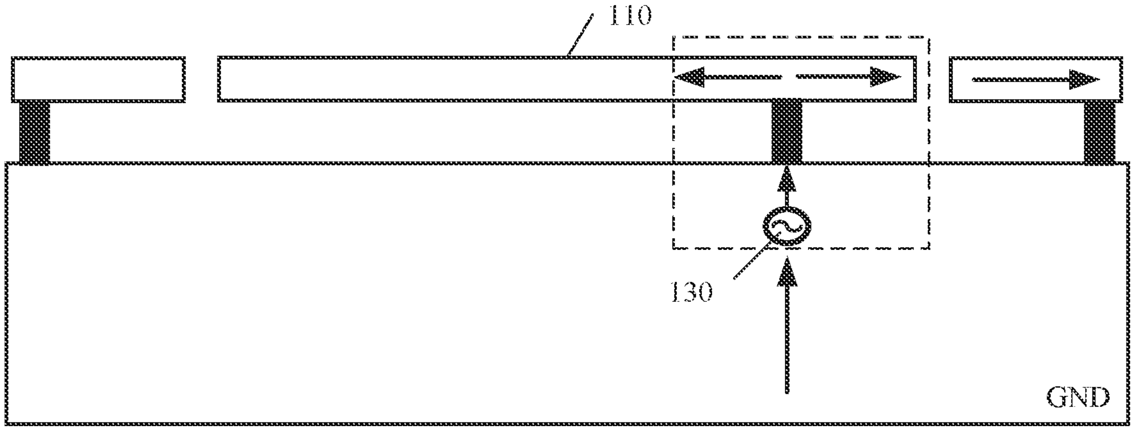
FIG. 25 is a distribution diagram of currents in a fourth resonance generated in the antenna structure shown in FIG. 21.

FIG. 22 to FIG. 25 are distribution schematic diagrams of currents of the antenna structure shown in FIG. 21. FIG. 22 is a distribution diagram of currents in a first resonance generated by an antenna structure when a first feed unit is feeding. FIG. 23 is a distribution diagram of currents in a third resonance generated by an antenna structure when a second feed unit is feeding. FIG. 24 is a distribution diagram of currents in a second resonance generated by an antenna structure when a first feed unit is feeding. FIG. 25 is a distribution diagram of currents in a fourth resonance generated by an antenna structure when a second feed unit is feeding.

As shown in FIG. 22 and FIG. 23, when the first feed unit is feeding, the antenna structure may work in a CM mode, and when the second feed unit is feeding, the antenna structure may work in a DM mode.

As shown in FIG. 24 and FIG. 25, in a region shown by a dashed box, when a first feed unit is feeding, the antenna structure may work in a DM mode, and when a second feed unit is feeding, the antenna structure may work in a CM mode.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna structure comprising:
a radiator comprising:
a central region:
an end;
a first feed point disposed in the central region; and
a second feed point disposed between the central region and the end;
a first feed unit configured to feed the antenna structure at the first feed point,
a second feed unit configured to feed the antenna structure at the second feed point,
wherein the antenna structure is configured to generate a first resonance when the first feed unit feeds the antenna structure,
wherein distances between all points in the central region and a center of the radiator are less than one sixteenth of a first wavelength, and
wherein the first wavelength corresponds to the first resonance.

2. The antenna structure of claim 1, wherein the antenna structure is configured to generate a second resonance when the first feed unit feeds the antenna structure, wherein a distance between the second feed point and the end is between three sixteenths of a second wavelength and five sixteenths of the second wavelength, wherein the second wavelength corresponds to the second resonance, and wherein a second frequency of a second resonance point of the second resonance is greater than a first frequency of a first resonance point of the first resonance.

3. The antenna structure of claim 2, wherein the antenna structure is further configured to generate a third resonance and a fourth resonance when the second feed unit feeds the antenna structure, and wherein a fourth frequency of a fourth resonance point of the fourth resonance is greater than a third frequency of a third resonance point of the third resonance.

4. The antenna structure of claim 3, wherein the first resonance and the third resonance correspond to a first operating frequency band of the antenna structure, and wherein the second resonance and the fourth resonance correspond to a second operating frequency band of the antenna structure.

5. The antenna structure of claim 4, wherein the first operating frequency band covers 2402 megahertz (MHz) to 2480 MHz in WI-FI or BLUETOOTH, and wherein the second operating frequency band covers 5 gigahertz (GHz) in WI-FI.

6. The antenna structure of claim 1, wherein a length of the radiator is half of the first wavelength.

7. The antenna structure of claim 1, wherein the antenna structure is further configured to:
generate a first pattern when the first feed unit feeds the antenna structure at the first feed point; and
generate a second pattern when the second feed unit feeds the antenna structure at the second feed point,
wherein the first pattern and the second pattern are complementary.

8. The antenna structure of claim 1, wherein the antenna structure is further configured to generate a second resonance when the first feed unit feeds the antenna structure, wherein a distance between the first feed point and the second feed point is between three eighths of a second wavelength and five eighths of the second wavelength, wherein the second wavelength corresponds to the second resonance and wherein a second frequency of a second resonance point of the second resonance is greater than a first frequency of a first resonance point of the first resonance.

9. An electronic device comprising:
an antenna structure comprising:
a radiator comprising:
a center;
a central region, wherein distances between all points in the central region and the center are less than one sixteenth of a first wavelength;
an end;
a first feed point disposed in the central region; and
a second feed point disposed between the central region and the end;
a first feed unit configured to feed the antenna structure at the first feed point; and
a second feed unit configured to feed the antenna structure at the second feed point,
wherein the antenna structure is configured to generate a first resonance when the first feed unit feeds the antenna structure, and
wherein the first wavelength corresponds to the first resonance.

10. The electronic device of claim 9, wherein the antenna structure is further configured to generate a second resonance when the first feed unit feeds the antenna structure, wherein a distance between the second feed point and the end is between three sixteenths of a second wavelength and five sixteenths of the second wavelength, wherein the second wavelength corresponds to the second resonance, and wherein a second frequency of a second resonance point of the second resonance is greater than a first frequency of a first resonance point of the first resonance.

11. The electronic device of claim 10, wherein the antenna structure is further configured to generate a third resonance and a fourth resonance when the second feed unit feeds the antenna structure, and wherein a fourth frequency of a fourth resonance point of the fourth resonance is greater than a third frequency of a third resonance point of the third resonance.

12. The electronic device of claim 11, wherein the first resonance and the third resonance correspond to a first operating frequency band of the antenna structure, and wherein the second resonance and the fourth resonance correspond to a second operating frequency band of the antenna structure.

13. The electronic device of claim 9, wherein the antenna structure is configured to:

generate a first pattern when the first feed unit is feeding the antenna structure at the first feed point; and generate a second pattern when the second feed unit is feeding the antenna structure at the second feed point and, wherein the first pattern and the second pattern are complementary.

14. The electronic device of claim 9, wherein the antenna structure is further configured to generate a second resonance when the first feed unit feeds the antenna structure, wherein a distance between the first feed point and the second feed point is between three eighths of a second wavelength and five eighths of the second wavelength, wherein the second wavelength corresponds to the second resonance, and wherein a second frequency of a second resonance point of the second resonance is greater than a first frequency of a first resonance point of the first resonance.

15. The electronic device of claim 9, further comprising an antenna support, wherein the antenna support comprises a surface, and wherein the first radiator is disposed on the surface.

16. The electronic device of claim 9, further comprising a rear cover, wherein the rear cover comprises a surface, and wherein the first radiator is disposed on the surface.

17. The electronic device of claim 9, wherein the electronic device is an earphone.

* * * * *